United States Patent
Carter et al.

(10) Patent No.: US 10,911,103 B2
(45) Date of Patent: Feb. 2, 2021

(54) PORTABLE ELECTRONIC DEVICE FOR FACILITATING A PROXIMITY BASED INTERACTION WITH A SHORT RANGE COMMUNICATION ENABLED OBJECT

(71) Applicant: International Forte Group LLC, Westport, CT (US)

(72) Inventors: Patrick L Carter, Lone Tree, CO (US); Laura M Rangel, Rancho Palos Verdes, CA (US); Julie E Sternberg, Westport, CT (US)

(73) Assignee: International Forte Group LLC, Westport, CT (US)

( * ) Notice: Subject to any disclaimer, the term of this patent is extended or adjusted under 35 U.S.C. 154(b) by 0 days.

(21) Appl. No.: 16/544,813

(22) Filed: Aug. 19, 2019

(65) Prior Publication Data

US 2020/0059269 A1 Feb. 20, 2020

Related U.S. Application Data

(60) Provisional application No. 62/719,682, filed on Aug. 19, 2018, provisional application No. 62/719,683,
(Continued)

(51) Int. Cl.
*H04B 5/00* (2006.01)
*H04B 5/02* (2006.01)
(Continued)

(52) U.S. Cl.
CPC .............. *H04B 5/02* (2013.01); *G06F 3/017* (2013.01); *H04B 5/0043* (2013.01); *H04B 7/02* (2013.01);
(Continued)

(58) Field of Classification Search
CPC ..... H04L 1/02; H04L 1/04; H04L 1/06; H04L 1/20; H04L 5/0007; H04W 4/80;
(Continued)

(56) References Cited

U.S. PATENT DOCUMENTS 10,108,827 B1 * 10/2018 Wurmfeld ............ G06Q 20/352
10,223,743 B2 * 3/2019 Walker ............... G06Q 20/3278
(Continued)

*Primary Examiner* — Nhan T Le
(74) *Attorney, Agent, or Firm* — Dhiraj Jindal; Patent Yogi LLC

(57) ABSTRACT

Disclosed herein is a portable electronic device for facilitating a proximity based interaction with a short range communication enabled object. Further, the portable electronic device may include a transceiver configured for transmitting a transmitted short range communication signal and receiving a received short range communication signal. Further, the portable electronic device may include a processor communicatively coupled to the transceiver, configured for detecting a proximity based event based on receiving the received short range communication signal from the short range communication enabled object, analyzing the received short range communication signal based on the detecting of the proximity based event, determining a second object identifier associated with the short range communication enabled object based on the analyzing, and performing a predetermined action based on the second object identifier. Further, the portable electronic device may include a memory device configured for storing a first digital asset and a first object identifier associated with the first digital asset.

12 Claims, 16 Drawing Sheets

Related U.S. Application Data filed on Aug. 19, 2018, provisional application No. 62/784,974, filed on Dec. 26, 2018, provisional application No. 62/784,985, filed on Dec. 26, 2018.

(51) Int. Cl.

| | | |
|---|---|---|
| *H04W 4/38* | (2018.01) | |
| *H04W 4/80* | (2018.01) | |
| *H04W 4/02* | (2018.01) | |
| *H04B 7/02* | (2018.01) | |
| *H04B 7/0413* | (2017.01) | |
| *H04B 7/022* | (2017.01) | |
| *H04B 7/0404* | (2017.01) | |
| *H04B 7/06* | (2006.01) | |
| *H04B 7/04* | (2017.01) | |
| *H04B 7/22* | (2006.01) | |
| *H04B 7/10* | (2017.01) | |
| *H04B 7/12* | (2006.01) | |
| *H04W 16/18* | (2009.01) | |
| *H04W 16/22* | (2009.01) | |
| *H04W 16/26* | (2009.01) | |
| *H04W 16/24* | (2009.01) | |
| *H04W 16/32* | (2009.01) | |
| *H04L 1/02* | (2006.01) | |
| *H04L 1/04* | (2006.01) | |
| *H04L 1/06* | (2006.01) | |
| *H04L 1/20* | (2006.01) | |
| *H04L 5/00* | (2006.01) | |
| *G06F 3/01* | (2006.01) | |
| *H04W 16/28* | (2009.01) | |
| *H04B 7/0491* | (2017.01) | |
| *G06K 9/00* | (2006.01) | |
| *G06F 1/16* | (2006.01) | |
| *H04W 4/21* | (2018.01) | |
| *H04L 29/08* | (2006.01) | |

(52) U.S. Cl.
CPC ............ *H04B 7/022* (2013.01); *H04B 7/028* (2013.01); *H04B 7/04* (2013.01); *H04B 7/0404* (2013.01); *H04B 7/0413* (2013.01); *H04B 7/0619* (2013.01); *H04B 7/10* (2013.01); *H04B 7/12* (2013.01); *H04B 7/22* (2013.01); *H04L 1/02* (2013.01); *H04L 1/04* (2013.01); *H04L 1/06* (2013.01); *H04L 1/20* (2013.01); *H04L 5/0007* (2013.01); *H04W 4/027* (2013.01); *H04W 4/38* (2018.02); *H04W 4/80* (2018.02); *H04W 16/18* (2013.01); *H04W 16/22* (2013.01); *H04W 16/24* (2013.01); *H04W 16/26* (2013.01); *H04W 16/32* (2013.01); *G06F 1/163* (2013.01); *G06F 1/1694* (2013.01); *G06K 9/00006* (2013.01); *H04B 7/0491* (2013.01); *H04B 7/06* (2013.01); *H04B 7/0602* (2013.01); *H04B 7/0621* (2013.01); *H04B 7/0628* (2013.01); *H04B 7/0697* (2013.01); *H04L 67/306* (2013.01); *H04W 4/023* (2013.01); *H04W 4/21* (2018.02); *H04W 16/28* (2013.01)

(58) Field of Classification Search
CPC ....... H04W 4/21; H04W 16/24; H04W 16/26; H04W 16/28; H04W 16/32; H04W 4/023; H04W 4/027; H04W 4/38; H04W 4/14; H04B 5/0043; H04B 5/02; H04B 7/02; H04B 7/022; H04B 7/028; H04B 7/04; H04B 7/0413; H04B 7/0491; H04B 7/06; H04B 7/0602; H04B 7/0619; H04B 7/0621; H04B 7/0628; H04B 7/0697; H04B 7/10; H04B 7/12; H04B 7/22

See application file for complete search history.

(56) References Cited

U.S. PATENT DOCUMENTS

| | | | | |
|---|---|---|---|---|
| 2012/0322374 | A1* | 12/2012 | Yamaoka | H04B 5/0062 455/41.1 |
| 2016/0371479 | A1* | 12/2016 | Wynen | G06F 21/36 |
| 2017/0004475 | A1* | 1/2017 | White | G07G 1/009 |

* cited by examiner

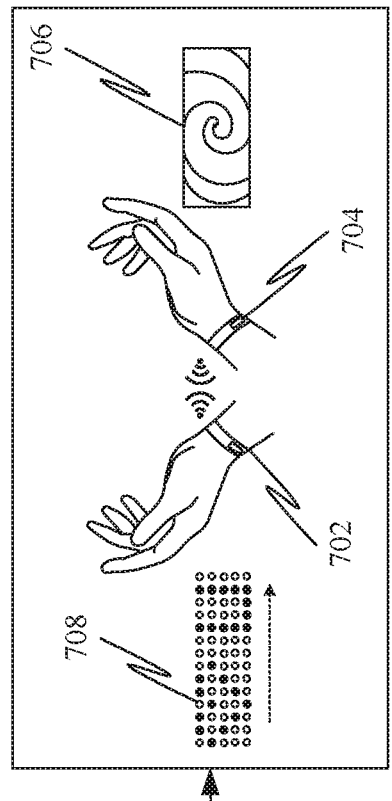
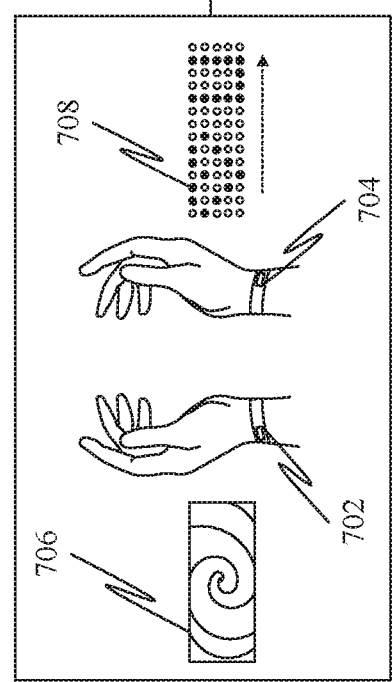
FIG. 7

PORTABLE ELECTRONIC DEVICE FOR FACILITATING A PROXIMITY BASED INTERACTION WITH A SHORT RANGE COMMUNICATION ENABLED OBJECT

RELATED APPLICATIONS

The present application claims priority to, and is a non-provisional application of Provisional Application No. 62/719,682 entitled: Close-Proximity Social Interaction and Creative Expression filed on 2018 Aug. 19; Application No. 62/719,683 entitled: Virtual Social Mesh Network filed on 2018 Aug. 19; Application No. 62/784,974 entitled: Method and System for Digital Un Boxing and Management of Digital Content and Collectibles filed on 2018 Dec. 26; and Application No. 62/784,985 entitled: Method and System for Creating Ad-Hoc Shared Virtual Experiences filed on 2018 Dec. 26, the disclosures of which are hereby incorporated by reference in their entirety herein and below.

Further, the present application is related to the following non-provisional applications entitled:
1. A FIRST PORTABLE ELECTRONIC DEVICE FOR FACILITATING A PROXIMITY BASED INTERACTION WITH A SECOND PORTABLE ELECTRONIC DEVICE BASED ON A PLURALITY OF GESTURES filed on Aug. 19, 2019;
2. SHORT RANGE COMMUNICATION ENABLED OBJECT FOR FACILITATING PROXIMITY BASED INTERACTION WITH AT LEAST ONE ELECTRONIC DEVICE filed on Aug. 19, 2019; and
3. A FIRST PORTABLE ELECTRONIC DEVICE FOR FACILITATING A PROXIMITY BASED INTERACTION WITH A SECOND PORTABLE ELECTRONIC DEVICE filed on Aug. 19, 2019.

TECHNICAL FIELD

Generally, the present disclosure relates to the field of data processing. More specifically, the present disclosure relates to a portable electronic device for facilitating a proximity based interaction with a short range communication enabled object.

BACKGROUND

Short range communication, such as Near-field communication (NFC) includes communication protocols that enable two electronic devices, that are close to each other (for e.g. within 4 cm), to establish mutual communication. Accordingly, two electronic devices (such as smartphones) under close proximity can share contacts, photos, videos or files using the NFC. Further, NFC is also used for facilitating making payments using mobile devices through NFC enabled Point of Sale (POS) devices.

However, the existing technologies fail to offer a rich user experience based on short range communication. For example, while sharing of information between electronic devices through short range communication is prevalent, current techniques do not provide for creating combined digital assets using short range communication. Further, short range communication data, is limited to transferring small amounts of data, e.g., no more than 100-550 bytes within 1-2 seconds, and typically requires close proximity throughout the data transfer or disconnection occurs.

Therefore, there is a need for an improved portable electronic device for facilitating a proximity based interaction with a short range communication enabled object that may overcome one or more of the above-mentioned problems and/or limitations.

BRIEF SUMMARY

This summary is provided to introduce a selection of concepts, in a simplified form, that are further described below in the Detailed Description. This summary is not intended to identify key features or essential features of the claimed subject matter. Nor is this summary intended to be used to limit the claimed subject matter's scope.

Disclosed herein is a portable electronic device for facilitating a proximity based interaction with a short range communication enabled object, in accordance with some embodiments. Further, the portable electronic device may include a transceiver configured for transmitting a transmitted short range communication signal and receiving a received short range communication signal, wherein each of the transmitting and the receiving is performed wirelessly over a short range communication channel. Further, the portable electronic device may include a processor communicatively coupled to the transceiver. Further, the processor may be configured for detecting a proximity based event based on receiving the received short range communication signal from the short range communication enabled object. Further, the processor may be configured for analyzing the received short range communication signal based on the detecting of the proximity based event. Further, the processor may be configured for determining a second object identifier associated with the short range communication enabled object based on the analyzing. Further, the processor may be configured for performing a predetermined action based on the second object identifier. Further, the portable electronic device may include a memory device communicatively coupled to the processor, wherein the memory device is configured for storing a first digital asset and a first object identifier associated with the first digital asset. Further, the short range communication enabled object may be configured for storing a second digital asset and a second object identifier associated with the second digital asset. Further, the short range communication enabled object may be configured for transmitting, wirelessly over the short range communication channel, each of the second digital asset and the second object identifier.

Also disclosed herein is a portable electronic device for facilitating a proximity based interaction with a short range communication enabled object, in accordance with some embodiments. Further, the portable electronic device may comprise a transceiver configured for transmitting a transmitted short range communication signal, wherein the transmitting is performed wirelessly over a short range communication channel. Further, the transceiver may be configured for receiving a received short range communication signal. Further, the receiving may be performed wirelessly over the short range communication channel. Further, the transceiver may be configured for receiving a second digital asset and a second object identifier associated with the second digital asset from the short range communication enabled object. Further, the portable electronic device may include a processor communicatively coupled to the transceiver. Further, the processor may be configured for detecting a proximity based event based on receiving the received short range communication signal from the short range communication enabled object. Further, the processor may be configured for creating a combined digital asset based on a first digital asset, and the second digital asset, wherein the creating of the combined digital asset is based on the proximity based event. Further, the portable electronic device may include a memory device communicatively coupled to the processor, wherein the memory device is configured for storing the first digital asset, the combined digital asset, and a first object identifier associated with the first digital asset. Further, the short range communication enabled object may be configured for storing a second digital asset and a second object identifier associated with the second digital asset. Further, the short range communication enabled object may be configured for transmitting, wirelessly over the short range communication channel, each of the second digital asset and the second object identifier.

Also disclosed herein is a portable electronic device for facilitating a proximity based interaction with a short range communication enabled object, in accordance with some embodiments. Further, the portable electronic device may comprise a transceiver configured for transmitting a transmitted short range communication signal and receiving a received short range communication signal, wherein each of the transmitting and the receiving is performed wirelessly over a short range communication channel. Further, the portable electronic device may comprise at least one sensor device configured to generate at least one of a first sensor data, and a second sensor data. Further, the portable electronic device may comprise a processor communicatively coupled to each of the transceiver, and the at least one sensor device. Further, the processor may be configured for detecting a pre-tap gesture based on the first sensor data received from the at least one sensor device. Further, the processor may be configured for entering the first portable electronic device in an interaction mode based on the detecting of the pre-tap gesture. Further, the processor may be configured for detecting a proximity based event based on receiving the received short range communication signal from the short range communication enabled object. Further, the processor may be configured for performing a predetermined action based on the detecting of the proximity based event. Further, the processor may be configured for detecting a post-tap gesture based on the second sensor data. Further, the processor may be configured for performing one of an acceptance and a rejection of the predetermined action based on the determining. Further, the portable electronic device may comprise a memory device communicatively coupled to the processor, wherein the memory device is configured for storing a first digital asset, a first object identifier associated with the first digital asset. Further, the short range communication enabled object may be configured for storing a second digital asset and a second object identifier associated with the second digital asset. Further, the short range communication enabled object may be configured for transmitting, wirelessly over the short range communication channel, each of the second digital asset and the second object identifier.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 7 is a representation of a system for facilitating a proximity based interaction with a short range communication enabled object, showing an exchange of digital assets, in accordance with some embodiments.

DETAILED DESCRIPTION

Figure 1:
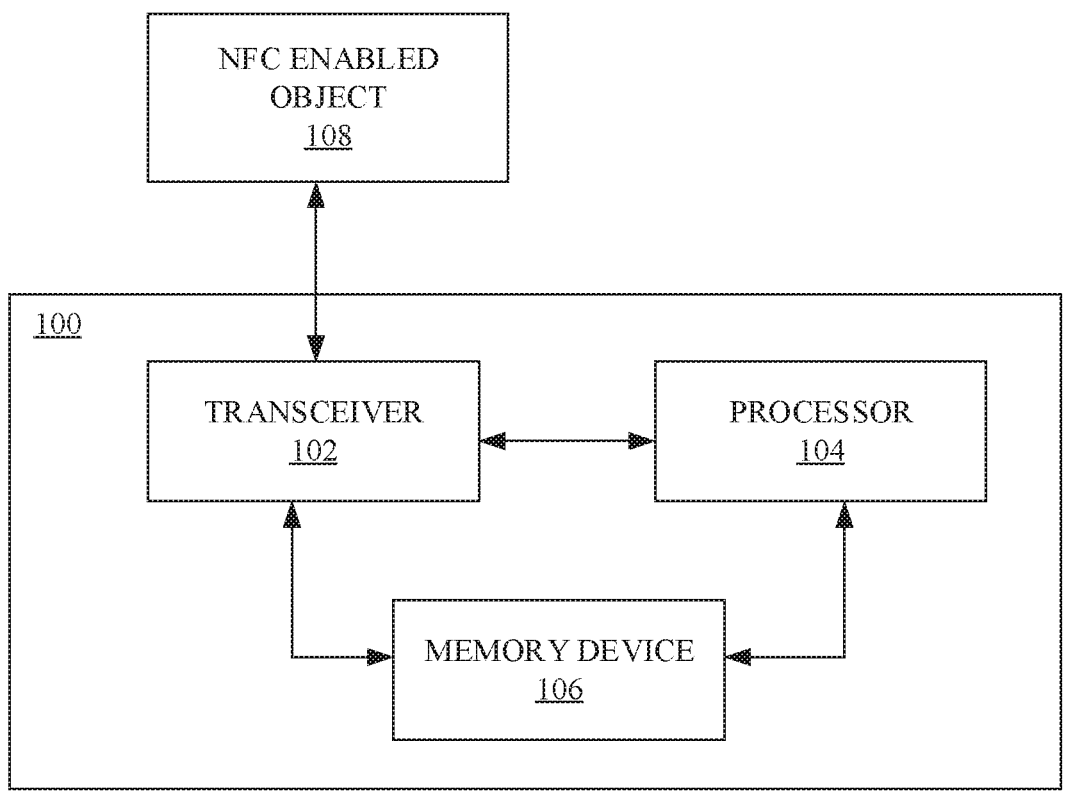
FIG. 1 is a block diagram of a portable electronic device for facilitating a proximity based interaction with a short range communication enabled object, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of, a portable electronic device for facilitating a proximity based interaction with a short range communication enabled object, embodiments of the present disclosure are not limited to use only in this context.

In general, the methods disclosed herein may be performed by one or more computing devices. For example, in some embodiments, the methods may be performed by a server computer in communication with one or more client devices over a communication network such as, for example, the Internet. In some other embodiments, the methods may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the methods disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the methods may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the methods may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the methods may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the methods may be performed at one or more spatial locations. For instance, the methods may be performed by a plurality of devices interconnected through a communication network. Accordingly, in an example, one or more steps of the methods may be performed by a server computer. Similarly, one or more steps of the methods may be performed by a client computer. Likewise, one or more steps of the methods may be performed by an intermediate entity such as, for example, a proxy server. For instance, one or more steps of the methods may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the methods operating on the sensitive data and/or a derivative thereof may be performed at the client device.

FIG. 1 is a block diagram of a portable electronic device 100 for facilitating a proximity based interaction with a short range communication enabled object 108, in accordance with some embodiments. The portable electronic device 100 may include a transceiver 102 configured for transmitting a transmitted short range communication signal and receiving a received short range communication signal. Further, the short range communication enabled object 108 may include an electronic device configured to communicate with the portable electronic device 100 over a communication channel, when in close proximity. Further, the short range communication enabled object 108 may be configured to transmit, and receive short range communication signals to the portable electronic device 100, and other short range communication devices over the communication channel, such as NFC, or BLE. (While shown as an "NFC enabled object" 108, it will be understood by those skilled in the art that, in alternative embodiments, other short-range communication protocols may be used instead of or in addition to NFC.) Further, each of the transmitting and the receiving may be performed wirelessly over the short range communication channel, including, but not limited to Bluetooth, Wi-Fi, ZigBee, and NFC. Further, the portable electronic device 100 may include a processor 104 communicatively coupled to the transceiver 102. Further, the processor 104 may be configured for detecting a proximity based event based on receiving the received short range communication signal from the short range communication enabled object 108. Further, in an embodiment, each of the transmitting and the receiving may be performed wirelessly over a Bluetooth Low Energy (BLE) channel. Further, in an embodiment, each of the transmitting and the receiving may be performed wirelessly over a Near Field Communication (NFC) channel over a dynamic NFC mode. Further, each of the transmitting, and the receiving may take place at a high speed, in a reliant manner over the dynamic NFC mode. For instance, in some embodiments, the portable electronic device 100 may toggle between a "read", and a "card emulator mode" when in the dynamic NFC mode.

Further, in an embodiment, the proximity based event may include at least one of a touching (such as tapping) of the portable electronic device 100 with the short range communication enabled object 108, detecting distance between the portable electronic device 100 and the short range communication enabled object 108 is within a predefined range, and a capturing of a visual code (such as, but not limited to, a QR code, a bar code, etc.) associated with the short range communication enabled object 108 using the portable electronic device 100.

Further, in an embodiment, the processor 104 may be configured for detecting the proximity based event based on a sensory data received from one or more sensors including at least one of a motion sensor, a proximity sensor, an accelerometer, an audio sensor, an image sensor, and a radio frequency sensor.

Further, the processor 104 may be configured for analyzing the received short range communication signal based on the detecting of the proximity based event. Further, the processor 104 may be configured for determining a second object identifier associated with the short range communication enabled object 108 based on the analyzing. Further, the processor 104 may be configured for performing a predetermined action based on the second object identifier. Further, the portable electronic device 100 may include a memory device 106 communicatively coupled to the processor 104. Further, the memory device 106 may be configured for storing a first digital asset and a first object identifier associated with the first digital asset.

Further, the short range communication enabled object 108 may be configured for storing a second digital asset and a second object identifier associated with the second digital asset. Further, in an instance, the second object identifier may include a unique identifier (UID) associated with the short range communication enabled object 108. Further, in an embodiment, the unique identifier (UID) associated with the short range communication enabled object 108 may include at least one of an NFC tag number associated with the short range communication enabled object 108, an IMEI number associated with the short range communication enabled object 108, and a network address associated with the short range communication enabled object 108, such as an IP address, and a MAC address. Further, in an embodiment, the second object identifier may comprise an NFC Data Exchange Format (NDEF) message, comprising a header and a payload. Further, the header may contain information such as the record ID, length, and type. Further, the type may define a sort of payload (second digital asset) that the record may contain.

Further, the short range communication enabled object 108 may be configured for transmitting, wirelessly over the short range communication channel, each of the second digital asset and the second object identifier.

Further, in some embodiments, the portable electronic device 100 may include a wearable electronic device. For instance, the portable electronic device 100 may include a short range communication enabled wearable smart band, smartwatch, a short range communication enabled ring, wristbands, smartwatches (e.g. Apple® watch), smart glasses (e.g. Google glasses®), E-textiles (e.g. Levi's commuter trucker Jacket), an NFC enabled ring, and so on.

Figure 15:
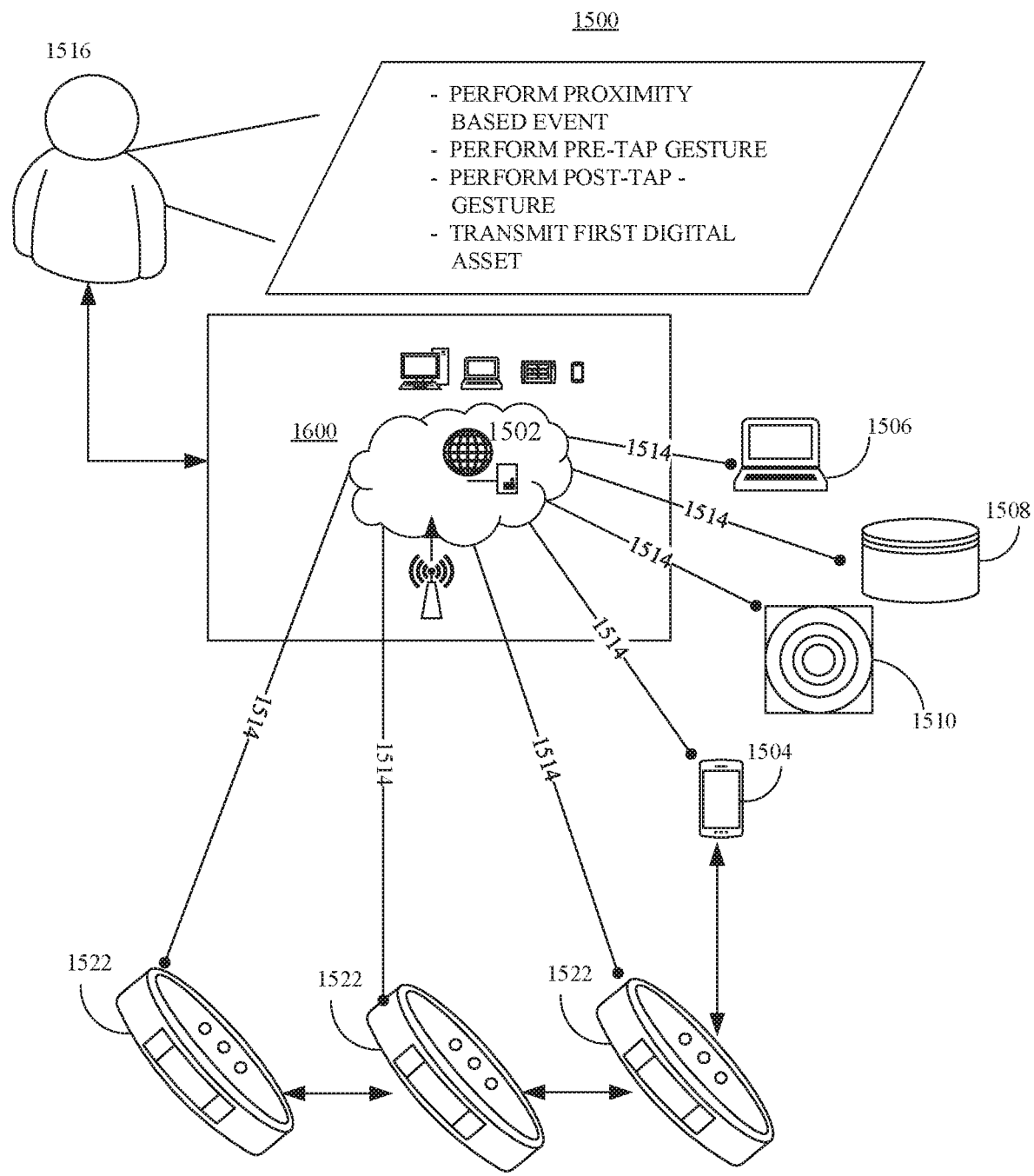
FIG. 15 is an illustration of the online platform consistent with various embodiments of the present disclosure.

Further, in some embodiments, the portable electronic device 100 may include a user device, such as the mobile device 1504 (such as a smartphone, a laptop, a tablet computer, etc.), and other electronic devices 1506 (such as desktop computers), as shown in FIG. 15.

Further, in some embodiments, the portable electronic device 100 may include a standalone short range communication reader and a standalone short range communication writer that may read one or more short range communication tags corresponding to the short range communication enabled object 108. Further, the portable electronic device 100 may be configured to be presented as a short range communication tag to the short range communication enabled object 108. Further, the portable electronic device 100 may include firmware that may read a short range communication tag of the short range communication enabled object 108 as a complex input. Further, the portable electronic device 100 may be configured to change an operation of the short range communication tag of the short range communication enabled object 108 after reading.

Further, in an embodiment, short range communication may include communication protocols enabling a plurality of devices (such as the portable electronic device 100, and the short range communication enabled object 108) to establish mutual communication. For instance, short range communication may allow the plurality of devices to establish mutual communication over Bluetooth network, a Bluetooth Low Energy (BLE) network, a Near Field Communication (NFC) network, and so on.

Further, in some embodiments, the short range communication enabled object 108 may include an NFC enabled object, such as one or more NFC enabled trading objects. Further, the one or more NFC enabled trading objects may include one or more electronic components, such as LED lights, flexible OLED displays, sound output devices such as speakers, and so on. Further, the one or more NFC enabled trading objects may be and may be configured to transmit and receive communication signals over NFC. For instance, an NFC enabled trading object of the one or more NFC enabled trading objects may be configured to transmit a second digital asset associated with the NFC enabled trading object. Further, the second digital asset of the NFC enabled trading object may include one or more of a pattern, a movement, a color, an effect, and so on that may be represented on the NFC enabled trading object through the one or more electronic components. Further, in some embodiments, the second digital asset may be transmitted to the portable electronic device 100 based on a pre-defined protocol (such as but not limited to, NFC logical link control protocol (LLCP) based on industry standard IEEE 802.2). Further, in some embodiments, the second digital asset may include one or more data packets. Each data packet of the one or more data packets, in an instance, may store information associated with the second digital asset in a binary form. For instance, the one or more data packets may store information such as, but not limited to, a unique identifier/address associated with an asset transmitting device (e.g. the short range communication enabled object 108) that may be transmitting the second digital asset to an asset receiving device (e.g. the portable electronic device 100), a length and/or a size (e.g. in bits) associated with the second digital asset, a type of content associated with the second digital asset (e.g. if the second digital asset may be a pattern, a visual object, a color, an audio, an audiovisual content, etc.), and so on. Further, the one or more data packets, in an instance, may include a series of binary digits arranged in a unique manner based on the predefined protocol, which may be decoded by the asset receiving device (e.g. the portable electronic device 100) in order to retrieve any stored information from the second digital asset. For instance, a set of first binary digits (say first 8 bits) may be reserved for the unique address associated with the asset transmitting device, which may allow the asset receiving device to decode from where (and/or from which device) the second digital asset may be received. Accordingly, next set of binary digits (say a set of next 8 bits), in an instance, may reflect the length and/or the size associated with the second digital asset. Further, next set of binary digits, in an instance, may be configured to store relevant message and/or information that may need to be transmitted from the asset transmitting device to the asset receiving device. One skilled in the art will appreciate that different organizations of the actual binary digits can be used to achieve the storage and transmission of information in accordance with aspects described herein.

Further, in some embodiments, the one or more data packets associated with the second digital asset may include security codes. Further, the security codes, in an instance, may be error-detecting codes that may be used by the asset receiving device in order to ensure integrity of the second digital asset (for e.g. detecting accidental changes in data associated with the second digital asset during communication). Further, the security code, in an embodiment, may include a cyclic redundancy code (CRC) and/or other security features. Further, in some embodiments, the second digital asset may be encrypted using a public-private key pair before transmitting the second digital asset from the asset transmitting device to the asset receiving device. Further, the asset receiving device, in an instance, may be configured to decrypt the encrypted second digital asset by using the same public-private key pair. Those skilled in the art will appreciate that other types of security codes or features may be used in accordance with aspects of embodiments of inventive concepts discussed herein.

Further, in some embodiments, the second digital asset may include cryptocurrencies that may be transmitted from the short range communication enabled object 108 to the portable electronic device 100 based on the proximity based event. For instance, the user may tap the short range communication enabled object 108 on the portable electronic device 100 (such as an NFC enabled vendor device, for e.g., a card swipe machine) in order to pay required amount using cryptocurrency.

Further, the one or more NFC enabled trading objects may correspond to at least one of, but may not be limited to, six key groups. The "groups" relate to patterns, colors, movement type, movement speed, effects, and stars, as described below. One skilled in the art will appreciate that other NFC enabled trading objects, providing different types of information to control the look and feel of a display on a mobile device and/or wearable device may be used.

Figure 6:
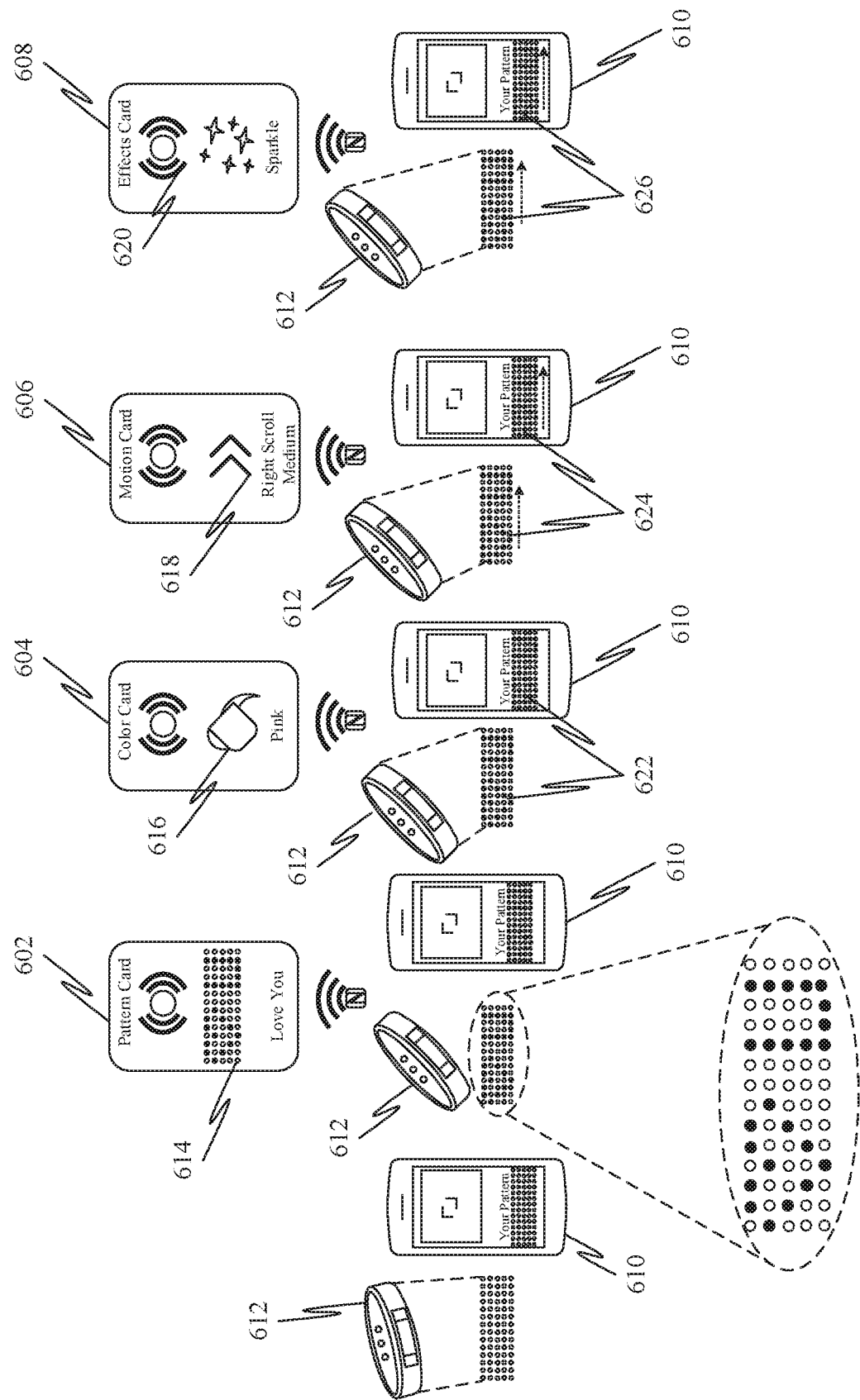
FIG. 6 is a representation of a system for facilitating a proximity based interaction with a plurality of short range communication enabled objects comprising a plurality of NFC enabled trading objects, in accordance with some embodiments.

For instance, the one or more NFC enabled trading objects may correspond to a "pattern" group. For instance, as shown in FIG. 6, a pattern card 602 may correspond to the "pattern" group. Further, the pattern card 602 may be configured to display one or more patterns through the one or more electronic components. Further, a second digital asset of the pattern card 602 may include the one or more patterns, such as the pattern 614. Further, a user device such as a mobile device 610, or a wearable device 612 may receive the pattern 614 on performing a proximity based event corresponding to the pattern card 602.

Further, in an instance, the one or more NFC enabled trading objects may correspond to a "color" group. For instance, as shown in FIG. 6, a color card 604 may correspond to the "color" group. Further, the color card 604 may be configured to display and one or more colors through the one or more electronic components. Further, a second digital asset of the color card 604 may include the one or more colors. For instance, the second digital asset of the color card 604 may include the color pink 616. Further, the mobile device 610, or the wearable device 612 may perform a proximity based event in the vicinity of the color card 604 and may receive the color pink 616. Further, the pattern 614 may be modified and may include the color pink 616 in order to form a new pattern 622.

Further, in an instance, the one or more NFC enabled trading objects may correspond to a "movement type and speed" group. For instance, as shown in FIG. 6, a movement type and speed card 606 may correspond to the "movement type and speed" group. Further, the movement type and speed card 606 may be configured to display one or more moving patterns through the one or more electronic components. Further, a second digital asset associated with the movement type and speed card 606 may comprise a movement and speed effect, such as right scroll medium effect 618. Further, the mobile device 610, or the wearable device 612 may perform a proximity based event in the vicinity of the movement type and speed card 606 and may receive the right scroll medium effect 618. Further, the pattern 614 may be modified and may include the right scroll medium effect 618 in order to form a new pattern 624.

Further, in an instance, the one or more NFC enabled trading objects may correspond to a "effects" group. For instance, as shown in FIG. 6, an effect card 608 may correspond to the "effects" group. Further, the effect card 608 may be configured to display one or more effects, such as a sparkle effect 620, increased or decreased brightness, blinking, and so on, which may be displayed through the one or more electronic components. Further, the mobile device 610, or the wearable device 612 may perform a proximity based event in the vicinity of the effect card 608 and may receive the sparkle effect 620. Further, the pattern 614 may be modified and may include the sparkle effect 620 in order to form a new pattern 626. Further, in an embodiment the mobile device 610 and the wearable device 612 may be configured to communicate with one or more NFC enabled objects, such as NFC enabled figurines, NFC enabled posters, and NFC enabled product packaging, and receive a second digital asset associated with the one or more NFC enabled objects.

Further, in an instance, the one or more NFC enabled trading objects may correspond to a "star" group. Further, the one or more NFC enabled trading objects may be configured to display one or more pre-built patterns, such as including one or more effects, and movement, and may represent one or more collectible characters, or celebrities. For instance, the one or more collectible characters may correspond to fictional characters corresponding to one or more video games, comics, TV shows, movies, and so on. Further, the one or more celebrities may include actors, sports players, and so on.

When it comes to the NFC enabled trading objects, as stated above, other cards are contemplated and would fall within the scope of this disclosure, e.g., an NFC enabled trading object controlling the timing of when something will be displayed, or volume associated with any related audio (if any exists), etc.

Further, in some embodiments, the short range communication enabled object 108 may include an NFC enabled poster.

Further, in some embodiments, the short range communication enabled object 108 may include an NFC enabled figurine.

Further, in some embodiments, the short range communication enabled object 108 may include an NFC enabled product packaging.

Further, each of the first digital asset and the second digital asset may comprise at least one of a static pattern, a colored pattern, a moving pattern, and a pattern may include one or more effects. Further, the one or more effects may include visual effects, such as sparkling, brightening, dimming, and flashing of a pattern comprised in each of the first digital asset, and the second digital asset. Further, the one or more effects may include audio effects. Further, the one or more audio effects may include at least one associated sound. Further, in some embodiments, the one or more effects may comprise haptic effects.

Further, the transceiver 108 may be configured to transmit the first digital asset to a user device, such as the portable electronic device 100 shown in FIG. 1. Further, the user device may be configured to modify the first digital asset. Further, the user device may be configured to transmit a modified first digital asset to the portable electronic device 100. Further, the portable electronic device 100 may have presentation capability such that the device 100 may be configured to present the modified first digital asset. Further, the portable electronic device 100 may have presentation capability such that the device 100 may configured to present the modified first digital asset.

Further, the short range communication enabled object 108 may be configured to transmit the second digital asset to a user device, such as portable electronic device 100 shown in FIG. 1. Further, the user device may be configured to modify the second digital asset. Further, the user device may be configured to transmit a modified second digital asset to the short range communication enabled object 108. Further, the short range communication enabled object 108 may include presentation capabilities and may be configured to present the modified second digital asset.

Further, in some embodiments, the predetermined action may include transmitting the first digital asset to the short range communication enabled object 108 based on the detecting. For example, consequent to the detecting, the first digital asset may be transmitted to the short range communication enabled object 108.

Further, in some embodiments, the short range communication enabled object 108 may be configured to store the first digital asset after performing the predetermined action.

For instance, if the portable electronic device 100 includes a mobile device, and the short range communication enabled object 108 comprises the NFC enabled trading object, a user, such as a user 1516 (as shown in FIG. 15) may launch a mobile application and may enter a point-and-shoot "create" mode with a window in an upper part, and an 'under construction' view in a lower part of a screen of the mobile device. Further, the proximity based event may include a tap of the mobile device with the NFC based trading object. Further, the second object identifier and the second digital asset may be transmitted to the mobile device. Further, the second digital asset, such as a pattern of the NFC enabled trading object may be automatically reflected in the under construction view. Further, the user may view a first digital asset corresponding to the mobile device, and may transmit the first digital asset to the short range communication enabled object 108. Further, in an instance, the user may customize the second digital asset. As a result, a user is enabled to tap the NFC based trading object and establish a communication channel and then receive, on the mobile device, a modifiable asset.

Further, in an embodiment, short range communication enabled object 108 may comprise a storage device configured for storing a designated number associated with the predetermined action. For instance, the designated number may include a number or other labeling information that may be stored in association with a digital asset.

Further, in some embodiments, the second digital asset may include a digital visiting card that may be shared with one or more users for social purposes. For instance, the digital visiting card may include social data (e g name, address, age, occupational details, contact information, user interests and so on) associated with a user. For instance, a first user (who may be operating the short range communication enabled object 108) may share the digital visiting card with a second user (operating the portable electronic device 100) by tapping the short range communication enabled object 108 with the portable electronic device 100. Further, in some embodiments, the user may be allowed to edit the social data (e.g. add and/or remove information in order to ensure privacy) that may be shared with other users. For instance, in a case where the first user is on a date with the second user and the first user may only wish to share name, and phone number only if the date goes well between them.

Accordingly, the first user may tap the short range communication enabled object 108 with the portable electronic device 100 in order to share the social data (such as only the name and the phone number).

Further, in some embodiments, the second digital asset may include digital art that may be shared with one or more users on one or more real-world occasions (such as, but not limited to, Christmas, international women's day, a movie premier day, and so on). For instance, the digital art may include a unique representation of a fictional character that may be associated with a movie that may be shared with the one or more users on the movie premier day. Further, in another instance, the digital art may include a unique picture of a famous historic woman that may be shared with the one or more users on the international women's day.

Further, in some embodiments, the transceiver 102 may be configured to transmit the short range communication signal to the short range communication enabled object 108, and receive the received short range communication signal from the short range communication enabled object 108 over an NFC communication channel. Further, the processor 104 may be configured for detecting the proximity based event based on receiving the received short range communication signal from the short range communication enabled object 108. Further, the processor 104 may be configured for performing the predetermined event based on the detecting. Further, the proximity based event may include transmitting the first digital asset to the short range communication enabled object 108, including at least one of a pattern, an image, a looped animation, a colored pattern including a coloration action on the pattern, a moving pattern including a movement action on the pattern, and a pattern comprising one or more effects. Further, transmitting the first digital asset to the short range communication enabled object 108 may be performed over a communication network including, but not limited to Bluetooth, Wi-Fi, and BLE.

Further, in some embodiments, the at least one of the portable electronic device 100 and the short range communication enabled object 108, in an instance, may be configured to communicate with an online platform, such as an online platform 1500, as shown in FIG. 15. Accordingly, the online platform 1500, in an instance, may provide a market user interface for a user (such as the user 1516) to perform interactive action associated with the second digital asset. Further, the market user interface, in an instance, may be a graphical user interface (GUI) allowing the user to craft, and/or alter one or more second digital assets by operating (for e.g. through gestures) the portable electronic device 100. Further, the market user interface, in an instance, may allow the user to observe, manipulate, capture, and/or purchase the one or more second digital assets. Further, the market user interface, in an instance, may allow the user to download and/or upload the one or more second digital assets from and/or to an online cloud market in order to share the one or more second digital assets with other users registered with the online platform 1500.

Further, in some embodiments, the online platform 1500 may provide an asset creating interface that may allow the users to create unique second digital assets (such as patterns) which may then be shared with other users through the market user interface. Further, the asset creating interface, in an instance, may allow the user to make and/or create the second digital asset through, for e.g., a movement of one or more body part of the user where the user may be wearing a wearable electronic device (e.g. the portable electronic device 100). Further, the movement, in an instance, may be sensed by the at least one sensor device (such as a motion sensor) associated with the portable electronic device 100. For instance, the user may create a shape (such as a triangular shape) by moving the hands (that may be holding the portable electronic device 100) in a triangular form in an actual space.

Further, in some embodiments, at least one of the portable electronic device 100 may include an unmanned aerial vehicle (UAV), such as a delivery drone. Further, the delivery drone, in an instance, may be the unmanned aerial vehicle that may be used by one or more logistic companies (such as DHL, Amazon logistics, etc.) in order to deliver one or more packages. Further, a user (operating the short range communication enabled object 108), in an instance, may accept the one or more packages delivered by the delivery drone by providing a one-time code to the delivery drone through the short range communication enabled object 108. For example, the user may tap the short range communication enabled object 108 with the delivery drone to transmit the second digital asset (e.g. the one time code) from the short range communication enabled object 108 to the delivery drone in order to accept the one or more packages delivered by the delivery drone.

Further, in some embodiments, a number of proximity based events resulting in the performance of the predetermined action may be limited by the designated number. For instance, the short range communication enabled object 108 may comprise an NFC enabled trading object providing a 'bank' of action capabilities. For example, an "8× Card" NFC enabled trading object may be configured to perform the predetermined event, such as sharing of an associated pattern (second digital asset) with the portable electronic device 100, such as a wearable object upon detection of the proximity based event (such as a tap from the portable electronic device 100) up to 8 times until the 'bank' is depleted. Further, upon detection of a proximity based event, the NFC enabled trading object may be configured to perform the predetermined event, such as transmitting of the second digital asset. Further, the short range communication enabled object 108 may be marked as "used" by the portable electronic device 100. In an embodiment, there is a variable tied to the digital asset and it is decremented, with each tap interaction to zero. Once the variable reaches zero, then it is depleted and is no longer available for use. Sharing is not available to users once depleted. In other embodiments, the "bank" can be replenished.

Further, in an embodiment, as shown in FIG. 7, a first wearable band 702 may be in communication with a second portable electronic device, e.g., second wearable band 704. Further, the predetermined action may include transmitting a first digital asset associated with the first wearable band 702 to the second wearable band 704.

Further, the predetermined action may include receiving a second digital asset associated with the second wearable band 704.

Further, the predetermined action may be exchanging the first digital asset, such as a first pattern 706, and the second digital asset, such as a second pattern 708 (including a moving pattern) between the first wearable band 702, and the second wearable band 704.

Further, in some embodiments, processor 104 may be configured for detecting a pre-tap gesture received at the portable electronic device 100. Further, an interaction-mode may be enabled in the portable electronic device 100 based on the detecting of the pre-tap gesture. Further, the portable electronic device 100 may be configured to perform the predetermined action, such as transmitting the first digital asset in the interaction mode. In other embodiments, multiple pre-tap gestures are contemplated, wherein each different pre-tap gesture can be evaluated to put the device into a different sharing mode. As an example, the device may share minimal contact information after a pre-tap shake of the device, wherein another example, the device may share much more extensive information following a twist of the device. Thus, the shake versus the twist defines the different mode the device will interact with others. Those skilled in the art will recognize that other gestures may be used and the resulting modes may be separately tied to such other gestures.

Further, the processor 104 may be configured for detecting a post-tap gesture received at the portable electronic device 100. Further, the predetermined action may be accepted based on the detecting of the post-tap gesture. Typically, the post-tap gesture is contemplated to acknowledge the exchange of information and, in some cases, accepting the intent of the exchange.

In some more specific examples, the 'pre-tap' gesture may comprise execution of a shake gesture to put the portable electronic device 100 into a "Share mode". Further, in another embodiment, the pre-tap gesture may comprise pressing of a button, such as a dedicated button on the portable electronic device 100 to put the portable electronic device 100 into the "share mode". Further, upon detection of the pre-tap gesture, such as through analysis of sensory information retrieved from one or more sensors (for e.g. accelerometers) associated with the portable electronic device 100, the short range communication enabled object 108, and the second portable device into a "Share mode". Further, upon detection of the pre-tap gesture, such as through analysis of sensory information retrieved from one or more sensors (for e.g. accelerometers) associated with the plurality of the portable electronic device 100, the short range communication enabled object 108, and the second portable device, the predetermined action, such as transmission of the first digital asset, the second digital asset, or a third digital asset associated with the second portable device may be performed.

Further, in some embodiments, the processor 104 may be configured for detecting a post-tap gesture from the plurality of the portable electronic device 100, the short range communication enabled object 108, and the second portable device. Further, the predetermined action may be accepted based on the detecting of the post-tap gesture.

Further, in an embodiment, the pre-tap gesture and the post-tap gesture may include at least one of a shaking of the portable electronic device 100, a movement (e.g. shaking) of the portable electronic device 100 in a specified manner, and a user-tapping of the portable electronic device 100, the short range communication enabled object 108, and the second portable device. Further, in some embodiments, each of the pre-tap gesture and the post-tap gesture may include selecting through various UI operations a control causing pre-tap functionality or post-tap functionality, wherein the selecting is performed explicitly by a user, For instance, the post-tap gesture may comprise execution of a shake gesture. Further, upon detection of the post-tap gesture, such as through analysis of sensory information retrieved from the one or more sensors (for e.g. accelerometers) associated with the portable electronic device 100 the predetermined action, may be accepted, such as comprising least one of an actualization and a saving of the first digital asset.

Further, in an embodiment, the processor 104 may be configured for generating a predetermined time delay subsequent to performance of the predetermined action. Further, the post-tap gesture may be received within an expiration of the predetermined time delay.

Figure 8:
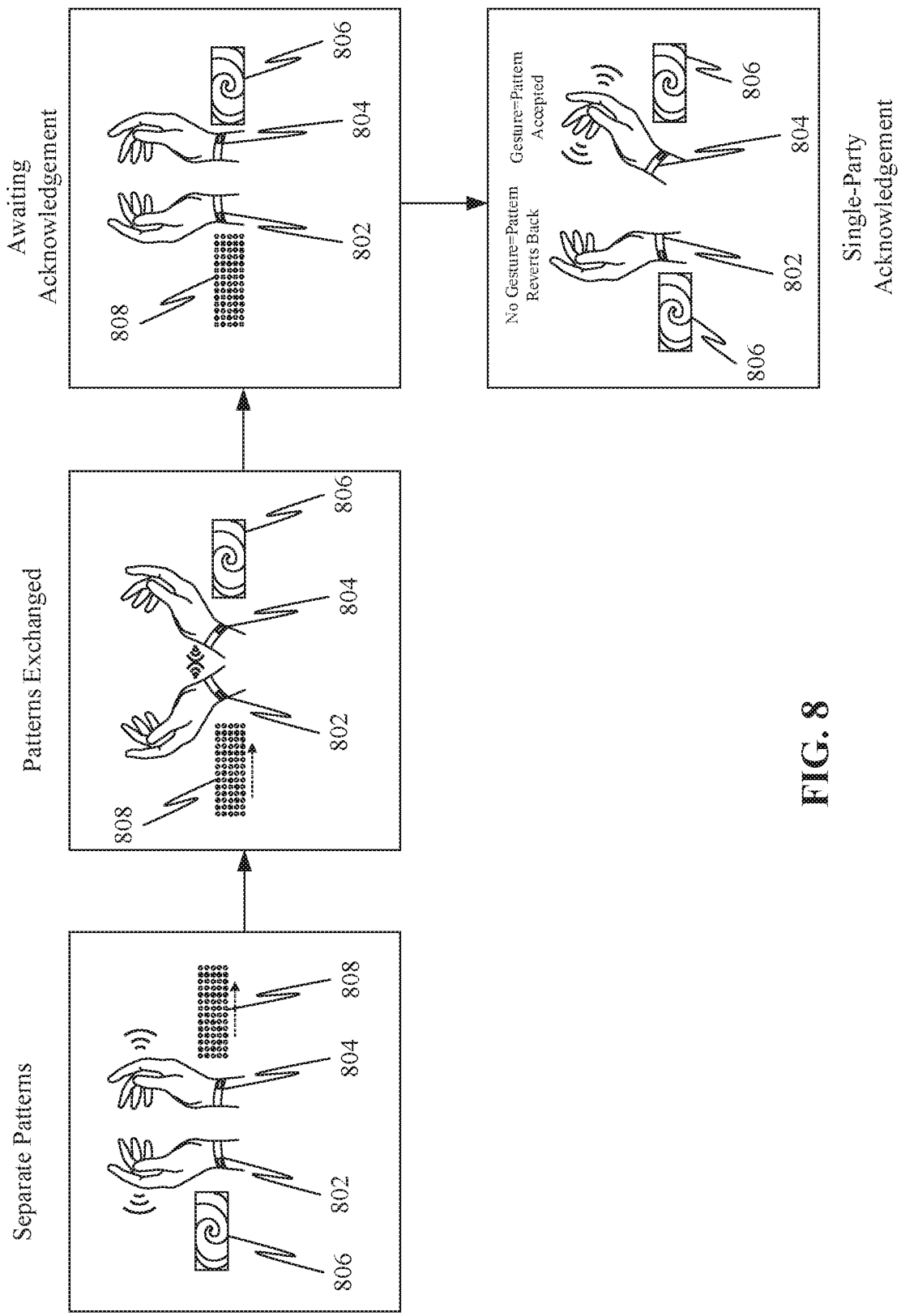
FIG. 8 is a representation of a system for facilitating a proximity based interaction with a short range communication enabled object, including a pre-tap gesture and a post-tap gesture, in accordance with some embodiments.
Figure 9:
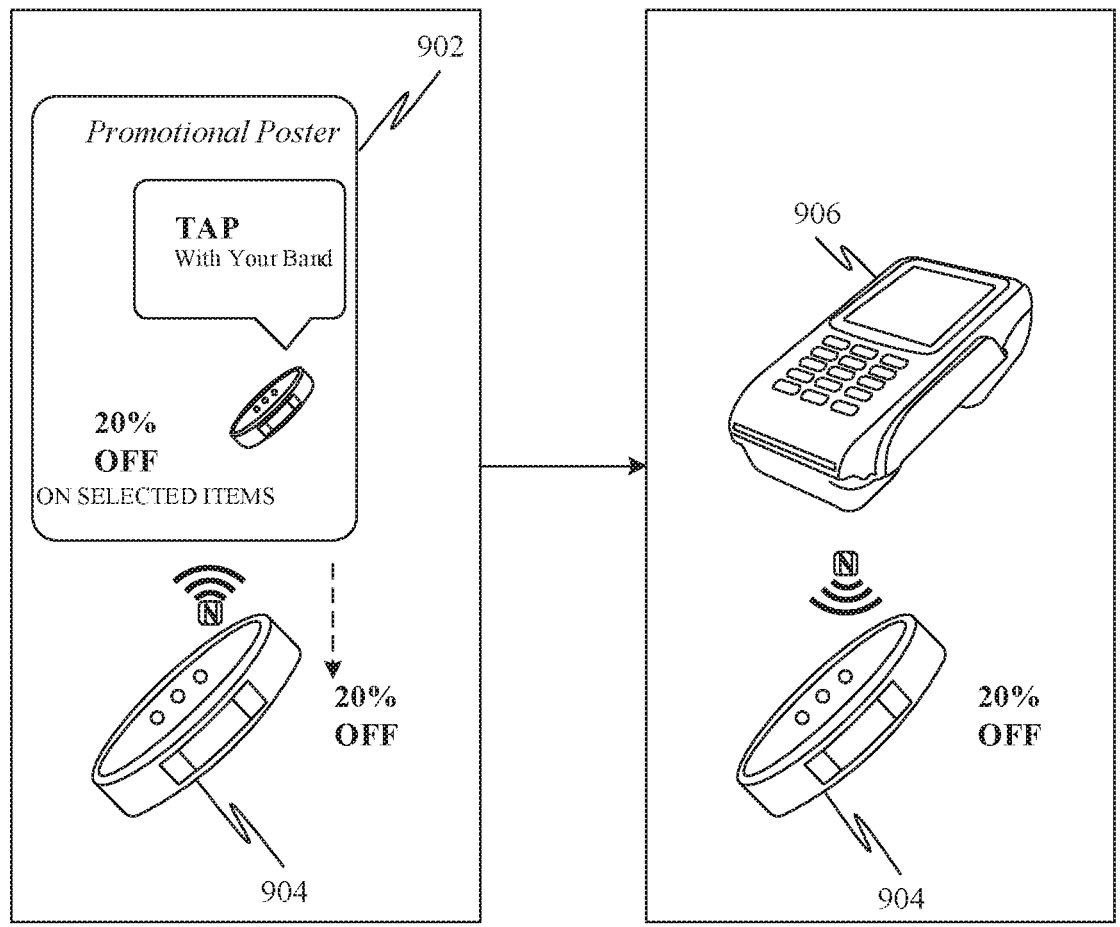
FIG. 9 is a representation of a system for facilitating a proximity based interaction with a short range communication enabled object, wherein the short range communication enabled object comprises a poster at a venue, in accordance with some embodiments.
Figure 10:
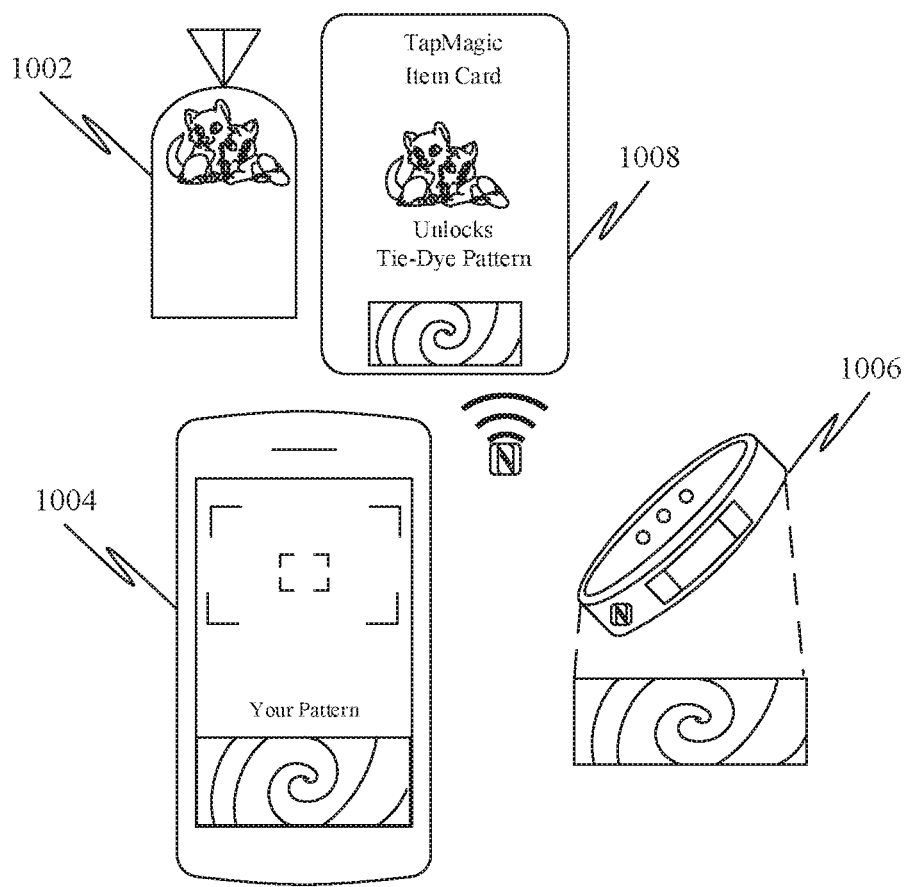
FIG. 10 is a representation of a system for facilitating a proximity based interaction with a short range communication enabled object, wherein the short range communication enabled object comprises a product packaging, in accordance with some embodiments.

For instance, as shown in FIG. 8, the portable electronic device 100 may comprise a first wearable band 802, and a second portable device may comprise a second wearable band 804. Further, the 'pre-tap' gesture may comprise execution of a shake gesture to put the first wearable band 802, and the second wearable band 804 into the "share mode". Further, upon detection of the pre-tap gesture, the predetermined action may be performed.

Further, the predetermined action may include at least one of transmitting the first digital asset to the second wearable band 804, receiving a third digital asset from the second wearable band 804, exchanging the first digital asset and the third digital asset between the first wearable band 802 and the second wearable band 804 based on the "share mode".

Further, the processor 104 may be configured for detecting the post-tap gesture from the first wearable band 802. Further, the predetermined action may be accepted based on the detecting of the post-tap gesture. For instance, the post-tap gesture may comprise execution of a shake gesture. Further, upon detection of the post-tap gesture, such as through analysis of sensory information retrieved from the one or more sensors (for e.g. accelerometers) associated with the first wearable band 802 the predetermined action, may be accepted, such as comprising at least one of an actualization and a saving of the first digital asset, such as a first pattern 806 and the third digital asset, such as a second pattern 808. For instance, the first wearable band 802 may not perform the post-tap gesture (say within the predetermined time) resulting in reverting the digital asset (such as storing the first pattern 806 instead of the second pattern 808 after the predetermined action). Further, the second wearable band 804, in an instance, may perform the post-tap gesture (say within the predetermined time) resulting in accepting the digital asset such as storing the first pattern 806 after the predetermined action.

Further, the processor 104 may be configured for creating a combined digital asset based on the first digital asset, and the second digital asset. Further, the creating of the combined digital asset may be based on the proximity based event.

For instance, in some embodiments, the first digital asset (such as a first pattern or artwork), and the second digital asset (such as a second pattern or artwork) may be required for the creation of the combined digital asset (which may, for e.g. correspond to a special, or locked pattern that may need to be unlocked). Further, the processor 104 may be configured to create the combined digital asset based on the proximity based event, such as a tap, as detected by the processor 104.

Further, in some embodiments, the combined digital asset may be created through encoding and decoding. Further, in an instance, WEBP encoding (as stored in the memory device 106, and the short range communication enabled object 108) may be configured to radically compress image/media size associated with the first digital asset, and the second digital asset, speeding up processing and enabling some 1-4 image collections to fit within an NDEF payload of NFC tags associated with at least one of the first digital asset, and the second digital asset with 1-2K of memory.

Further, in an embodiment, the processor 104 may be configured for associating a plurality of second digital assets with a plurality of short range communication enabled objects, including the short range communication enabled object 108. Further, the combined digital asset may include special pattern, such as a digital art requiring the plurality of short range communication enabled objects, such as a plurality of NFC enabled trading objects to unlock. Further, in an instance, a user may possess the plurality of short range communication enabled objects and may perform the proximity based event to cause the creation of the combined digital asset.

Figure 2:
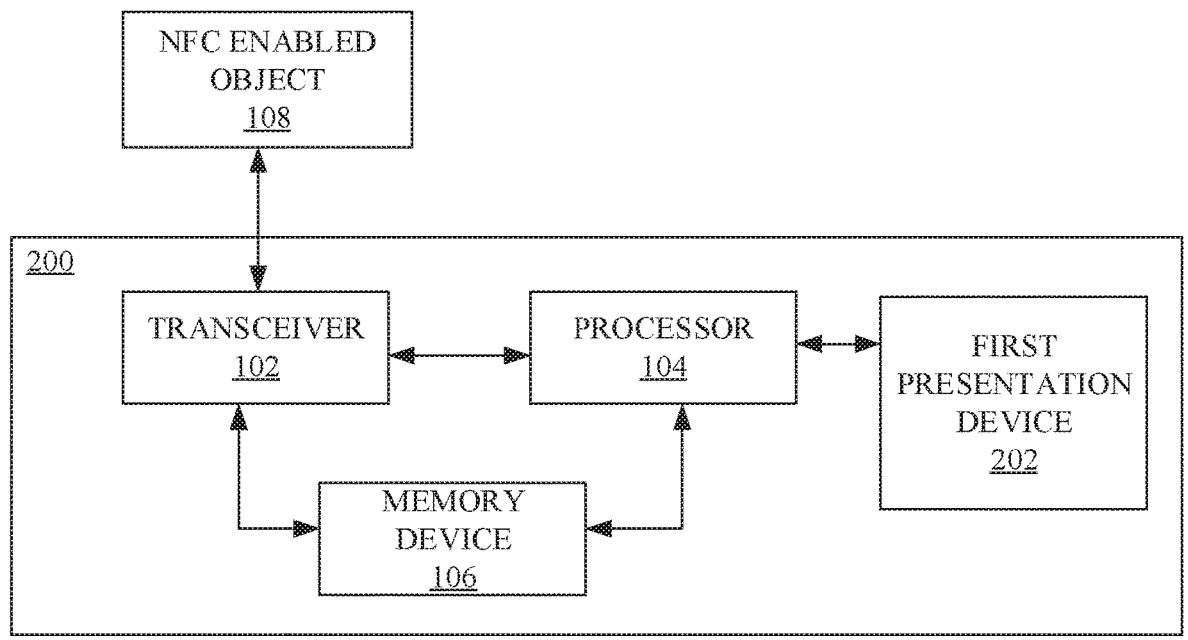
FIG. 2 is a block diagram of a portable electronic device for facilitating a proximity based interaction with a short range communication enabled object, comprising a first presentation device, in accordance with some embodiments.

Further, in some embodiments, as shown in FIG. 2, the portable electronic device 100 may include a first presentation device 202 configured to present the first digital asset. Further, the short range communication enabled object 108, (shown as an NFC enabled object, but it is contemplated that object 108 may utilize other short range communication protocols instead of or in addition to NFC) may include a second presentation device configured to present the second digital asset. Further, the presentation device, in an instance, may be an output device that may be used to present the combined digital asset to the user. In some embodiments, the presentation device may include at least one of a display device, an audio device, and a haptic feedback device. Further, the display device, in an instance, may be configured to present the combined digital asset in a way such that the user may be able to view the combine digital asset. For instance, the display device may include, but not limited to) Light emitting diode (LED), Organic LED, Active-matrix OLED, Liquid crystal display (LCD), 3D display, flexible display, holographic display, and so on. Further, the audio device, in an instance, may be configured to present the combined digital asset in a way such that the user may be able to perceive audible characteristics associated with the combined digital asset. For instance, the audio device may include, but not limited to, a speaker device. Further, the haptic feedback device, in an instance, may be configured to present the combined digital asset in a way such that the user may be able to feel any tactile characteristic associated with the combined digital asset. For instance, the haptic feedback device may include, but not limited to, a vibration motor.

Further, in an embodiment, the short range communication enabled object 108 may include a poster 902 within a venue. Further, the second digital asset associated with the poster 902 may comprise discount coupons corresponding to the venue. Further, upon detection of a proximity based event, such as a tap of the portable electronic device 100, such as a wearable band 904, the predetermined action, comprising a receiving of the second digital asset (the discount coupons) from the poster 902 may be performed. For instance, the discount coupons may comprise coupons allowing the user to avail 20% discount on selected items. Further, the second digital asset may be utilized by the wearable band 904 by transmission of the second digital asset (coupons allowing the user to avail 20% discount on selected items) to a vendor device 906. Further, in an instance, the portable electronic device 100 may be configured to be presented as the coupon to the vendor device.

Further, in an embodiment, the wearable band 904 may comprise a storage device configured for storing a designated number associated with the predetermined action (transmission of the second digital asset to the vendor device). Further, a number of proximity based events resulting in the performance of the predetermined action (transmission of the second digital asset to the vendor device 906) may be limited by the designated number. Accordingly, the number of times that the coupon may be used at the vendor device 906 may be limited by the designated number.

Further, in an embodiment, the short range communication enabled object 108 may include a product packaging, such as a Hello Kitty® backpack 1002. Further, the predetermined action may comprise transmission of the second digital asset, such as a special pattern, DIY creative element, or promotion, of the Hello Kitty® backpack 1002 to the portable electronic device 100, such as a mobile device 1004, or a wearable device 1006. Further, the second digital asset may be transmitted to a second short range communication enabled object 108, such as a short range communication enabled trading object 1008.

Further, in an embodiment, if the portable electronic device 100 includes a mobile device, and the short range communication enabled object 108 comprises the NFC enabled trading object, a user, such as the user 1516 may enter a point-and-shoot "create" mode with a window in an upper part, and an 'under construction' view in a lower part of a screen of the mobile device. Further, the proximity based event may include a scanning of the NFC based trading object, such as scanning of a QR code of the NFC based trading object. Further, the predetermined action may comprise transmission of the second object identifier, and the second digital asset to the mobile device. Further, the second digital asset, such as a pattern of the NFC enabled trading object may be automatically reflected in the 'under construction' view. Further, in an instance, the user may modify the second digital asset to create a modified second digital asset. Further, the user may transmit the modified second digital asset.

For instance, as shown in FIG. 6, the first mobile device 610, may scan the pattern card 602.

Further, in some embodiments, the portable electronic device 100 may comprise an embedded electronic device. Further, the embedded electronic device may be embedded in a body of the user 1516.

Further, in some embodiments, the portable electronic device 100 may comprise a printed electronic device. Further, the printed electronic device may be printed on one or more substrates using printing equipment suitable for defining patterns on material, such as screen printing, flexography, gravure, offset lithography, and so on.

Further, in some embodiments, the short range communication enabled object 108 may comprise a 3D display device. Further, the 3D display device may comprise a 3D display configured for displaying the second digital asset associated with the 3D display device. Further, the second digital asset corresponding to the second digital device may comprise 3D digital art, one or more 3D patterns, and so on.

Further, in an embodiment, the short range communication enabled object 108 may comprise a flexible display configured for displaying one or more images, patterns, and art associated with the second digital asset.

Further, in some embodiments, the short range communication enabled object 108 may comprise a holographic display device. Further, the holographic display device may comprise a holographic display configured for displaying the second digital asset associated with the holographic display device. Further, the second digital asset corresponding to the second digital device may comprise holographic digital art, one or more holographic patterns, and so on.

Figure 3:
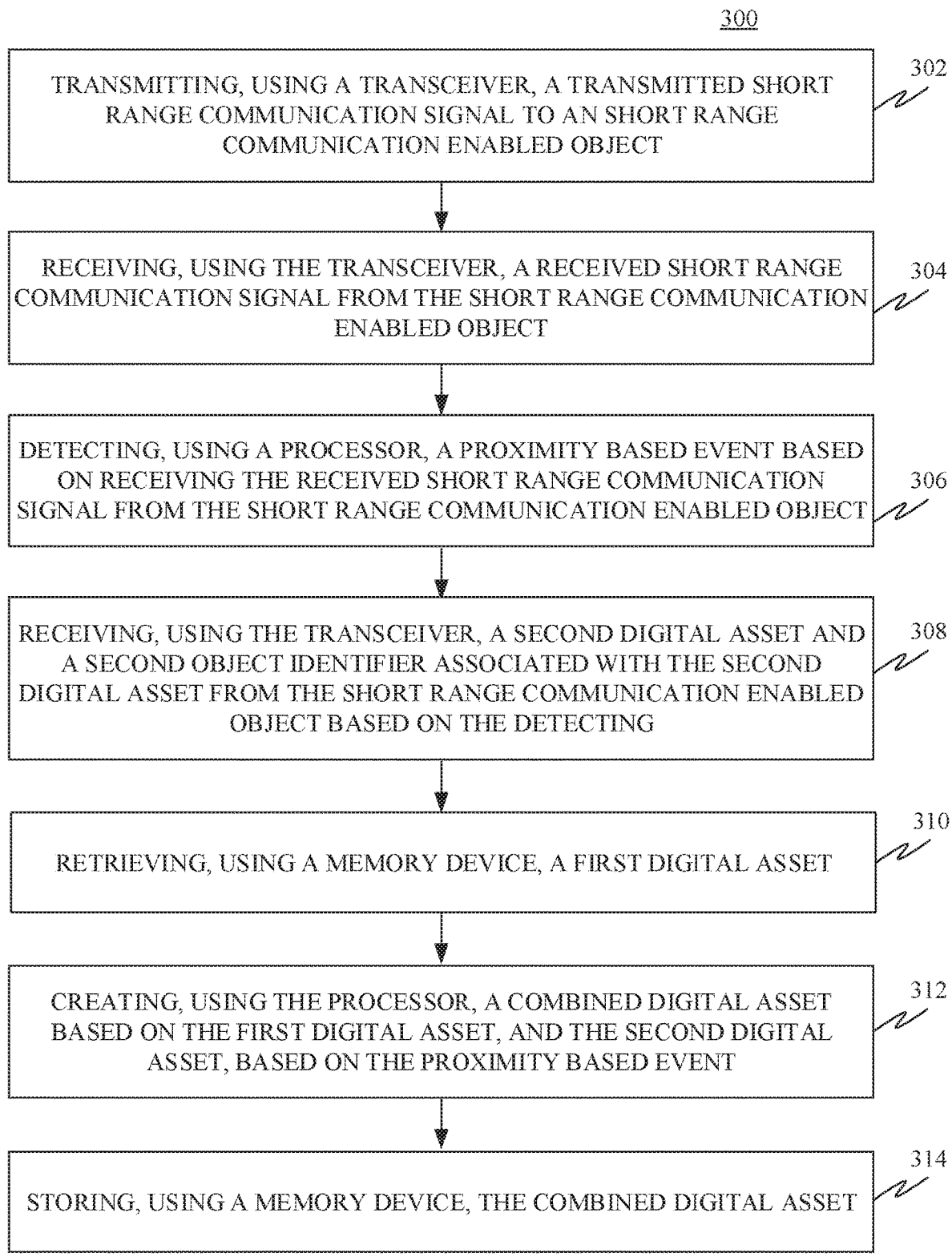
FIG. 3 is a flowchart of a method for facilitating a proximity based interaction with a short range communication enabled object, in accordance with some embodiments.

FIG. 3 is a flowchart of a method 300 for facilitating a proximity based interaction with a short range communication enabled object, in accordance with some embodiments. In some embodiments, the method 300 may be performed by a portable electronic device, such as the portable electronic device 100.

Further, at 302, the method 300 may include transmitting, using a transceiver, such as the transceiver 102, a transmitted short range communication signal to the short range communication enabled object.

Further, at 304, the method 300 may include receiving, using the transceiver, a received short range communication signal from the short range communication enabled object. Further, each of the transmitting and the receiving may be performed wirelessly over a short range communication channel.

Further, at 306, the method 300 may include detecting, using a processor, such as the processor 104, a proximity based event based on receiving the received short range communication signal from the short range communication enabled object.

Further, at 308, the method 300 may include receiving, using the transceiver, a second digital asset and a second object identifier associated with the second digital asset from the short range communication enabled object based on the detecting.

Further, at 310, the method 300 may include retrieving, using a memory device, such as the memory device 106, a first digital asset.

Further, at 312, the method 300 may include creating, using the processor, a combined digital asset based on the first digital asset, and the second digital asset, in response to the proximity based event.

Further, at 314, the method 300 may include storing, using a memory device, the combined digital asset.

According to some embodiments, a portable electronic device for facilitating a proximity based interaction with a short range communication enabled object is disclosed. Further, the portable electronic device may include a transceiver configured for transmitting a transmitted short range communication signal and receiving a received short range communication signal. Further, the transceiver may be configured to receive a second digital asset, and a second object identifier associated with the second digital asset from the short range communication enabled object. Further, each of the transmitting and the receiving may be performed wirelessly over a short range communication channel. Further, the portable electronic device may include a processor communicatively coupled to the transceiver. Further, the processor may be configured for detecting a proximity based event based on receiving the received short range communication signal from the short range communication enabled object. Further, the processor may be configured for analyzing the received short range communication signal based on the detecting of the proximity based event. Further, the processor may be configured for creating the combined digital asset (e.g. digital art) based on the proximity based event. Further, the creating of the combined digital asset may be based on the first digital asset and the second digital asset.

Further, the portable electronic device may include a memory device communicatively coupled to the processor. Further, the memory device may be configured for storing the first digital asset, a first object identifier associated with the first digital asset, and the combined digital asset.

Further, the short range communication enabled object may be configured for storing a second digital asset and a second object identifier associated with the second digital asset. Further, the short range communication enabled object may be configured for transmitting, wirelessly over the short range communication channel, each of the second digital asset and the second object identifier.

Further, in some embodiments, the portable electronic device may include a wearable electronic device. Further, in some embodiments, the short range communication enabled object may include an NFC enabled trading object. Further, in some embodiments, the short range communication enabled object may include a short range communication enabled poster. Further, in some embodiments, the NFC enabled object may include a short range communication enabled product packaging. Further, in some embodiments, the NFC enabled object may include an NFC enabled product. Further, in some embodiments, the NFC enabled object may include an NFC enabled figurine.

Figure 4:
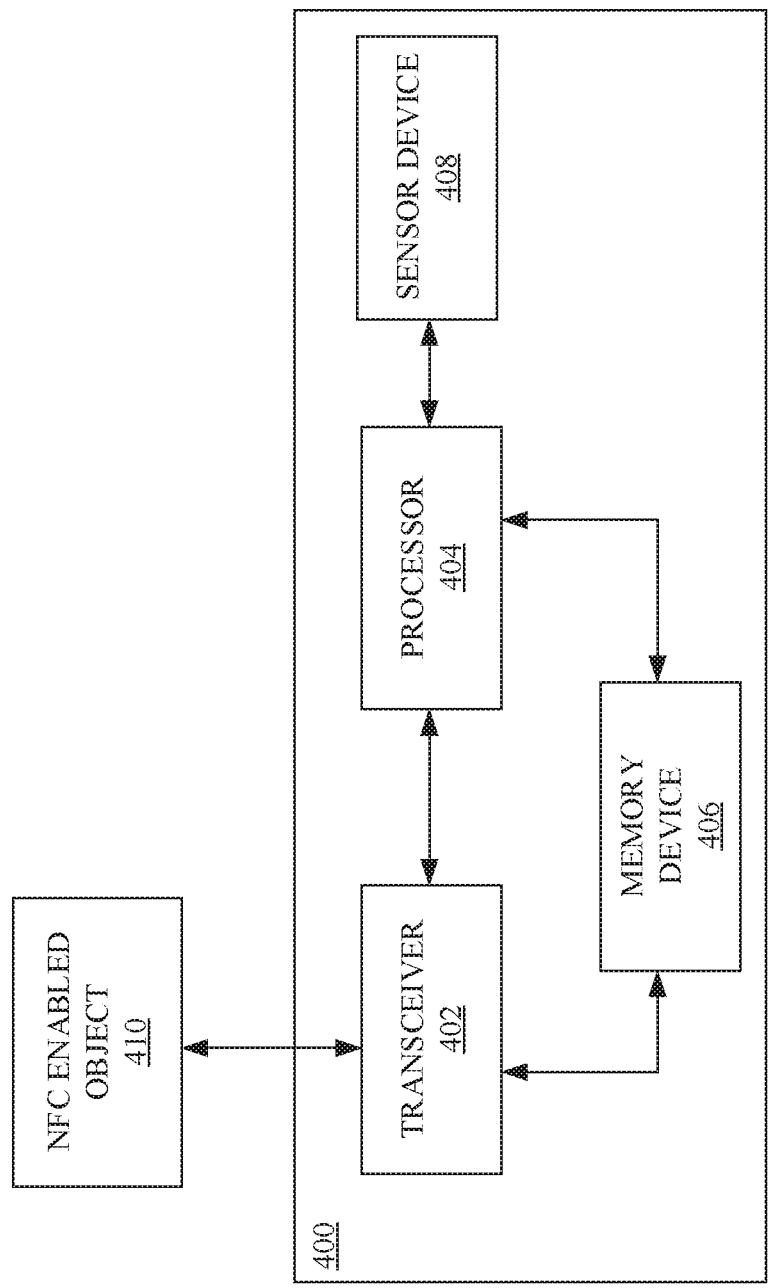
FIG. 4 is a block diagram of a system for facilitating a proximity based interaction with a short range communication enabled object in accordance with some embodiments.

FIG. 4 is a block diagram of a portable electronic device 400 for facilitating a proximity based interaction with a short range communication enabled object 410, in accordance with some embodiments. While object 410 is shown in FIG. 4 as an NFC enabled object, but it is contemplated that object 410 may utilize other short range communication protocols instead of or in addition to NFC. Further, the portable electronic device 400 may include a transceiver 402 configured for transmitting a transmitted short range communication signal and receiving a received short range communication signal. Further, each of the transmitting and the receiving may be performed wirelessly over a short range communication channel. Further, the portable electronic device 400 at least one sensor device 408 configured to generate at least one of a first sensor data, and a second sensor data. Further, the portable electronic device 400 may include a processor 404 communicatively coupled to the transceiver 402. Further, the processor 404 may be configured for detecting a pre-tap gesture based on the first sensor data received from the at least one sensor device 408. Further, the processor 404 may be configured for entering the first portable electronic device 400 in an interaction mode based on the detecting of the pre-tap gesture. Further, the processor 404 may be configured for detecting a proximity based event based on receiving the received short range communication signal from the short range communication enabled object 410. Further, the processor 404 may be configured for performing a predetermined action based on the detecting of the proximity based event. Further, the processor 404 may be configured for detecting a post-tap gesture based on the second sensor data. Further, the processor 404 may be configured for performing one of an acceptance and a rejection of the predetermined action based on the determining. Further, the portable electronic device 400 may include a memory device 406 communicatively coupled to the processor 404. Further, the memory device may be configured for storing a first digital asset and a first object identifier associated with the first digital asset.

Further, the short range communication enabled object 410 may be configured for storing a second digital asset and a second object identifier associated with the second digital asset. Further, the short range communication enabled object 410 may be configured for transmitting, wirelessly over the short range communication channel, each of the second digital asset and the second object identifier.

Further, in some embodiments, the portable electronic device 400 may include a wearable electronic device.

Further, in some embodiments, the short range communication enabled object 410 may include at least one of a short range communication enabled trading object, a short range communication enabled poster, and a short range communication enabled product packaging.

Further, each of the first digital asset and the second digital asset may include at least one of a static pattern, a colored pattern, and a moving pattern.

Further, in some embodiments, the predetermined action may include receiving the second digital asset. Further, the memory device may be configured for storing the second digital asset based on the detecting of the post tap gesture.

Further, in some embodiments, the predetermined action may include transmitting the first digital asset to the short range communication enabled object 410 based on the detecting.

Further, in some embodiments, the short range communication enabled object may include a second portable electronic device. Further, the first digital asset may include a first user interest associated with a first user of the portable electronic device. Further, the second digital asset may include a second user interest associated with a second user of the second portable electronic device. Accordingly, the predetermined action may include transmitting a second notification to the second portable electronic device. Further, the predetermined action may include creating a group of two or more portable electronic devices including the first portable electronic device and the second portable electronic device. For example, the first user interest (more generally a first profile) and the second user interest (more generally a second user profile) may include a commonality. As a result, the second notification transmitted to the second portable electronic device may enable the second user to initiate and/or establish an online and/or an offline contact with the first user associated with the portable electronic device. Further, in some embodiments, at least one of detecting the proximity and transmitting of the second notification is based on at least one of the first user attribute and the second user attribute. Further, at least one of the first user attribute and the second user attribute may be configurable by one or more users.

Further, in some embodiments, the processing device may be configured for performing a method of transferring information to the second portable electronic device. Further, the method may include a step of identifying a plurality of first portions associated with the first digital asset. Further, the method may include a step of determining a plurality of first state values associated with the first portions, wherein a first state value associated with a first portion represents at least one of a visibility of the first portion and a life-span of the first portion. Further, the method may include a step of encoding each of the plurality of first portions and the plurality of first state values into a single object. For example, in some embodiments, the step of encoding may be performed in accordance with a proprietary Domain Specific Language (DSL) for one or more of content encoding, compression, description, and data/interaction management, as disclosed herein. Further, the method may include a step of transmitting the single object to the second portable electronic device. Further, the second electronic device may be configured for presenting the plurality of first portions in accordance with the plurality of first state values.

Further, in some embodiments, the processing device may be further configured for initiating a countdown timer associated with a predetermined time duration based on creating the group of portable electronic devices. Further, the processing device may be further configured for detecting a second proximity based event based on receiving the received short range communication signal from a third portable electronic device within expiration of the countdown timer. Further, the processing device may be configured for transmitting a third notification to the third portable electronic device based on the detecting. Further, the processing device may be configured for updating the group of portable electronic devices to include the third portable electronic device. Additionally, the processing device may be configured for synchronizing at least one of time and digital asset across the group of portable electronic devices.

Further, upon creation and/or updating of the group, the countdown timer may be re-initiated providing a time window for a subsequent portable electronic device to be added to the group.

Further, in some embodiments, the processing device may be further configured for generating a shared digital asset based on the first digital asset, the second digital asset and the third digital asset. Further, the transceiver may be further configured for transmitting the shared digital asset to each of the second portable electronic device and the third portable electronic device. Accordingly, the portable electronic device in some instances may function as a master friend in order to facilitate creation of the shared digital asset such as a virtual meetup room. Accordingly, the virtual meetup room may include digital representations of each of the first user, the second user and the third user in the form of a first avatar, a second avatar and a third avatar respectively.

Further, in some embodiments, generating the shared digital asset may be based on a state of the portable electronic device. Further, the state of the portable electronic device may include at least one first characteristic of the first digital asset. For instance, in an instance the shared digital asset may include a first reward associated with the first user. Accordingly, the first reward may be generated based on a first characteristic of the first digital asset, such as, for example, the first avatar. For instance, the first reward may be generated only if the first avatar does not already possess the first reward. Likewise, a second reward may be generated by the second portable electronic device based on a second characteristic of the second digital asset. Similarly, a third reward may be generated by the third portable electronic device based on a third characteristic of the third digital asset.

Figure 5:
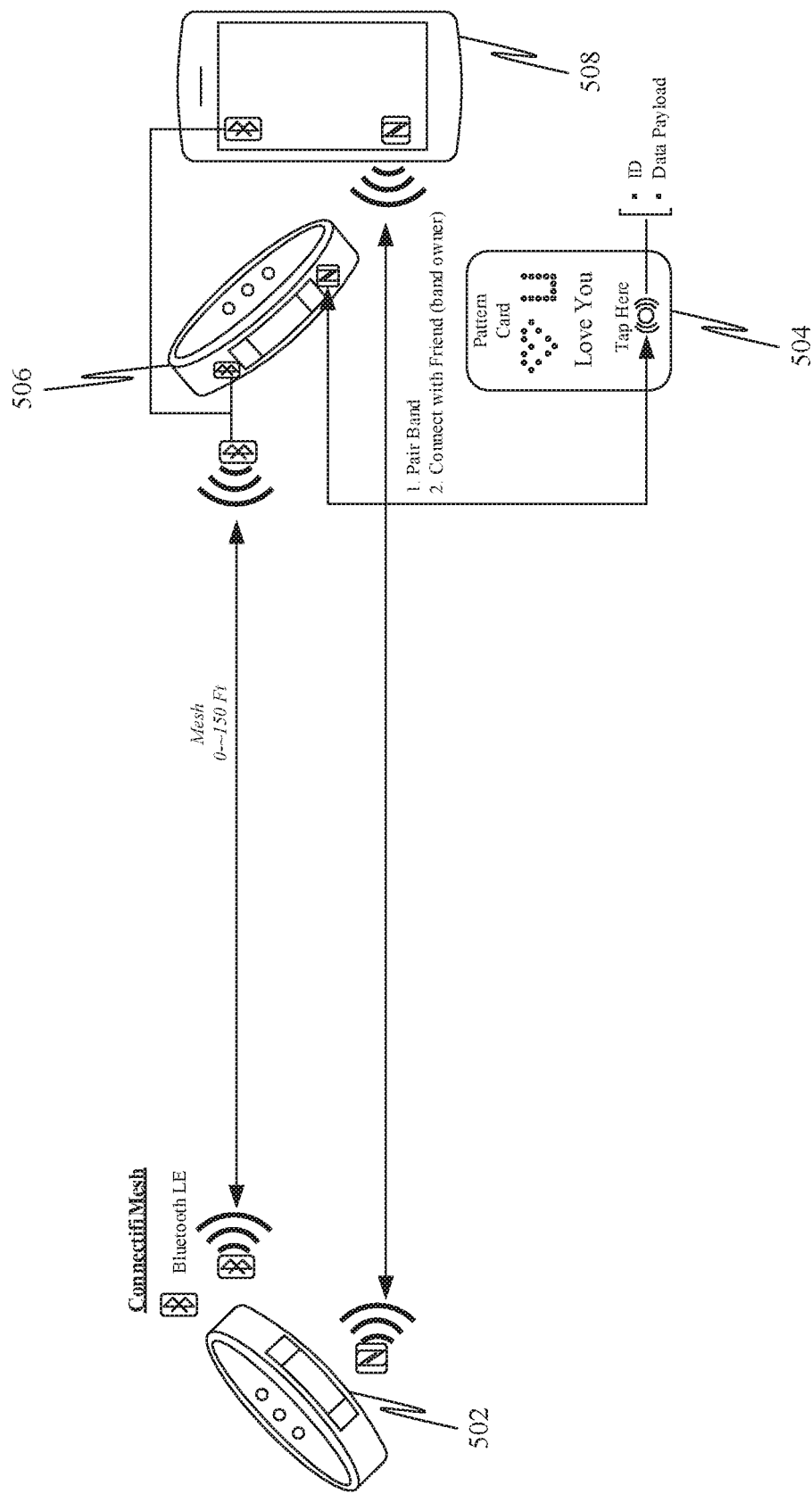
FIG. 5 is a representation of a system for facilitating a proximity based interaction with a short range communication enabled object, in accordance with some embodiments.

FIG. 5 is an exemplary representation of a portable electronic device, such as a TapMagic band 502, for facilitating a proximity based interaction with a TapMagic trading object 504, in accordance with some embodiments. A user, such as the user 1516 may purchase the TapMagic band 502 that may be packaged with one or more of the TapMagic trading object 504. In an embodiment, the one or more of the TapMagic trading object 504 may be purchased separately. Further, the user may perform a proximity based event, such as a tap in the vicinity of the TapMagic trading object 504 to create, or transmit a digital art (corresponding to a second digital asset of the TapMagic trading object 504), which may consist of visual, haptic, and audio elements.

In some embodiments, the user may also tap a second TapMagic band 506 to transmit a first digital asset associated with the TapMagic band 502, such as one or more of a digital art, pattern, and so on. Further, in some embodiments, the portable electronic device may include a user device 508. Further, a device firmware of the user device 508 may be configured to read the second TapMagic band 506 and react to an object identifier of the second TapMagic band 506. Further, the user device 508 may be configured to receive the second digital asset. Further, in an instance, the user device 508 may be configured to modify the second digital asset. Further, in an instance, the user device 508 may be configured to transmit a third digital asset associated with the user device to the TapMagic trading object 504.

Further, in an embodiment, the portable electronic device, including the TapMagic band 502, and the user device 508 may include a Host App MCU, such as an NRF52832 or equivalent, an NFC tag, an NFC reader IC, such as a CR95HF or equivalent, an accelerometer, such as BMA280 or equivalent, an OLED display, such as a CFAL9664B-F-

B2 or equivalent, LEDs, and custom proprietary firmware to support device interaction and content/state sharing.

According to some embodiments, a parallelized social network processing based on real-time user behavior and real-world interaction is disclosed.

Further according to some embodiments, a system for forming a virtual social mesh network based on social connectivity is disclosed. The system may comprise a mesh graph driven by establishing social connections as well as perspective individuals with shared interests.

Further, social mesh of interconnectivity may be established between devices based on a social connectivity of a user with a plurality of users of other devices. Further, the social mesh of interconnectivity may be established between one or more wearable devices based on a social connectivity corresponding to a plurality of users. Social mesh device In an example, a virtual social connection, per aspects of the present disclosure, may be established by mutual friends who may have invited and/or accepted invitations may become friends and individuals that may not be connected as friends but whose social profiles may share one or more of common shared interests or experiences. For instance, a virtual social connection, per aspects of the present disclosure, may be established by mutual friends who may have invited and/or accepted invitations may become friends, i.e., not just mutual friends. The invitations/acceptances are to/from those individuals who are already considered friends. Further, in another example, a virtual social connection may have established between individuals who may not be connected as friends (or through mutual friends) but whose social profiles may share one or more of common shared interests or experiences.

Further, the social mesh may overlay a geographical component highlighting a location of the one or more users, such as from a user device, such as a wearable or may be obfuscated to a home or default location. Further, the one or more users may also enable or disable visibility to other users or may share an interest or prospects to other users. Thus, it may be possible to see users that may be interconnected through intermediaries.

Further, the social mesh may allow users to send real-time social interaction notifications via the one or more Social mesh devices or a mobile application to access the social network, to one or more users and sub-groups of users. Further, the social interactions may be manifested in real-time on wearable devices of the one or more users.

Further, a profile of a user may also be populated with filtered locations (e.g. bars, restaurants, venues, etc.) or higher-level aggregations like cities. A Social mesh device of the one or more Social mesh devices, or the mobile application may be enabled/disabled to report information on a category (e.g. restaurants, bars, salons, sports venues, etc.), location hierarchy level (e.g. individual establishment, neighborhood, city, county, or state, etc.), and frequency level (e.g. unique count, high/medium/low frequency, or visited/not visited) which may facilitate intersecting 'shared interests' based on user behavior instead of requiring profile updates, providing additional fodder for social engagement around shared locations visited.

Further, the system may derive potential interests automatically and add the interests to a profile of a user or may allow the user to accept or reject the interest. For example, if a user visits a ski resort an interest in skiing can be automatically derived for profile updates.

Further, the system may leverage social login and consented access to one or more social media platforms associated with a user, such as LinkedIn® and Facebook® profiles to 'seed' profile without having to re-create information interest information that the user may have on the one or more social media platforms.

Further, the social mesh may provide latent social information useful for deriving interesting useful insights for conversation and human connectivity. For example, the social mesh may allow two individuals in a bar to be notified that the individuals may share an interest in scuba-diving, and/or that they have both been to Grand Cayman.

Further, location-trail and derived-interest may significantly increase information such as location and interest. Further, location-trail and derived-interest information may be more trustworthy/factual due to being driven from actual behavior and location profiles.

Further, according to some embodiments, a method and system for proximity-driven social discovery description is disclosed. The system may provide automatic notification of individuals with shared interest within proximity. For instance, a user may walk into a bar and be notified that 4 scuba-divers may be present in the bar.

The system may utilize wearable device proximity detection to notify users of shared interest intersections. When a user is within 150 feet of one or more users with a shared interest, one or more notifications may be automatically sent to a Social mesh device of the user, which may be expanded upon user input. Additional information may be provided for one or more friends of the user.

If a user is a "share-interest" user (the user may share one or more interests), then basic information may be provided based on profile options (e.g. first name, gender, hair color, etc.). Further, if a user is in anonymous mode, then a notification including an acknowledgment ability to tap again to transmit an LED pattern or vibration upon acknowledgment may be transmitted to a user device of the user. Further, the system may may derive shared interest profile intersections while online or offline. Further, the system may include wearable firmware or mobile software capability to report geolocation via one or more sensors such as GPS or Bluetooth to a cloud-based network, such as the online platform 1500 for interesting location trail with points of interest.

Embodiments of the present invention relate to wearable firmware that reports a proximity detection to a social mesh device to maintain a state of various devices in proximity with each other. The service is able to access data associated with users or wearers of the devices and determine shared-interest intersections of any new device within proximity to other devices, and dispatch notifications/updates to all relevant devices/device owners with the social engagement information. Further, the system may provide social discovery in an automatic and easy manner that may lead to conversation and engagement. Further, the system may not require social dis-engagement and a distraction of looking at a phone and lighting up a dark venue with the light from its display.

Further, according to some embodiments, a system for visualizing a social mesh network description is disclosed. The capability to visually display interconnectivity/mesh amongst users based on social parameters as well as show the mesh amongst close proximity users (e.g., within Bluetooth range of 150 feet, in some embodiments) and how that mesh extends to others virtually across the country or global.

The visualization may show and update varying thicknesses of lines (number of connections) and a size of circles (user or user aggregation). The visualization may be readily available for individual consumption or for display via broadcast media. In an embodiment, lines and circles may be replaced by other visualizations.

The visualization may also display varying intensities based on behaviors such as pumping fists or cheering allowing individuals and event coordinators to see and react to activities in real-time. For instance, based on activities, a visualization may describe that the state of Chicago may be atop a leader board for energy level.

Further, in an embodiment, the system may be configured to display interaction codes to increase remote engagement in social events. For instance, QR codes may be displayed from broadcast media so one or more users may scan the QR codes, such as using one or more user devices to register a thumb up which may be reflected in a display. Further, in an embodiment, promotion codes may also be displayed corresponding to one or more discounts.

Further, the system may visually engage and reward typically passive remote event participants (e.g. TV event viewers) so that the participants may feel a part of the event.

Further, the system may visually "connect" a user to an event and one or more individuals connected to the event. Further, a user John Doe may be interviewed in Time Square and may be connected to viewers (or places) across country. Further, one or more visual indicators may increase in intensity as one or more users associated with John Doe, such as friends and family may cheer him on.

Further, according to some embodiments, a system for managing and interacting with a social mesh network is disclosed. This system may entail mechanisms for managing what could be a prohibitively large social mesh networks generating tens to hundreds of thousands of events per second. The system may provide an ability to slice the active social mesh based on various dimensions for visualization, social discovery and aggregate, social feedback, and advertisements, and promotion targeting.

Further, the system may entail maintaining social mesh structure via a stateful streaming data algorithm running on a distributed computing platform.

Further, the system may execute an algorithm that may maintain a set of adjustable device states and state machines related to active social mesh graphs. Further, a device state may include current state, last known state, cluster connected to, an array of device events, current state age, and social connection array. Further, Network/Cluster State may include social mesh graph (nodes social linkage), and a number of connections. Further, device/owner profile intersections may include interest items intersecting with profile updates.

Further, promotion profile and state may include promotion profile parameters (e.g. offers, promotion thresholds), and promotion target parameters. Further, the promotion profile and state may include processing of new or changed promotion events in real-time. Further, social slice control stream may include monitoring a control stream that may configure social segment states and formulation or teardown of segments based on intersects. Further, social slice output/visualization state may include visualization-optimized data output. Further, event stream may include social mesh device events including but not limited to device join/dormant/departure, device sensor events, algorithms for real-time cleansing and geo-mapping location trails to maps and determining point of interest intersects, and algorithms for processing point-of-interest intersects to shared interest profile updates. This process may broadcast update to a pub/sub mechanism that both a database (such as databases 1508 as shown in FIG. 15), in an instance known as social mesh device database, as well as social mesh processes/algorithms are listening to for updates.

Further, the system may process extremely large, dynamic social mesh graphs in real-time. Further, the system may target and deliver visual codes to, and process responses (e.g. code recognition with phone or device, detecting and linking user behavior to presentation of promotions, etc.) in real-time. Further, the system may show on-demand effects in sub-second or with minimal latency from the time of command. Further, the system may handle thousands and potentially millions of data points per second to gauge mesh changes, participant behaviors, and promotional overlay in real-time. Further, the system may effectively deliver key state information and updates on a real-time basis for Effective visualization and management.

According to some embodiments, a method and system for digital unboxing, sharing, and management of digital content and collectibles is disclosed. Further, the system may be a simplified system for revealing device-based, personal, digital content based on physical proximity and/or interaction with other devices or tags, and storing and managing digital collectibles. Further, a device may include a wristband, watch, phone, tablet, any other programmable electronic device, or, any other device like a figurine, book, trading object or poster may encompass an RFID-type tag. Further, an object may include an NFC tag, an unpowered object, specially coded object, or a device emulating a tag. Further, an event mode may include a firmware state within which two or more proximal devices may interact in real-time to provide a group shared experience and content reveals (unboxing). Further, an unconnected device may correspond to one or more electronic devices that may not require an internet, Wi-Fi, mobile phone/device, or type of data communications connect in order to operate and deliver a user experience. Further, content may embody characters, images, facts, mystery reveals, accessories, badge counters, GIFs or other short animations, virtual room or any other acquisition of items. Further, NFC and NFMI may be utilized as a close-proximity-based communication mechanism. Further, NFC may be used henceforth for brevity. Further, BLE may refer to Bluetooth Low Energy. Further, a tap may correspond to a device physically touching or coming within an allowable range of an NFC range of a second device or object.

Further, the system may facilitate digital unboxing, collection, and sharing through social interaction with only a tap through a technical and gesture-based ecosystem. Further, the system may facilitate gamification, device interactions, such as with one or more Virtual Reality (VR) devices.

Further, according to some embodiments, a system to facilitate revealing of pre-loaded associated with unconnected devices is disclosed. Further, in an embodiment, the system may be called as "Collectif-i" or "Collect-i-dek" system.

Figure 11:
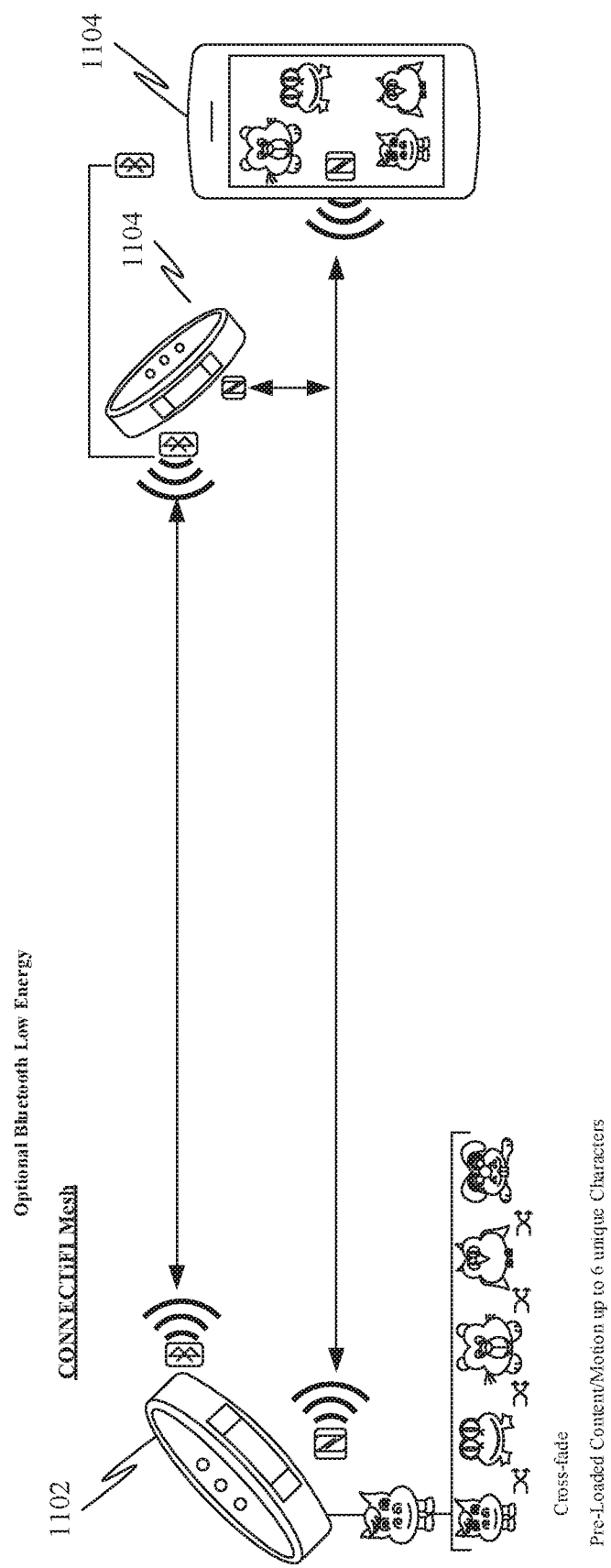
FIG. 11 is a representation of an exemplary system for facilitating a proximity based interaction with a short range communication enabled object, in accordance with some embodiments.

Further, the system may include a device with both Bluetooth and NFC transceiver functionality and firmware to support communication with one or more devices, or objects, and for and content/state sharing. Further, the device may be configured for communicating and sharing content, or state without internet, Wi-Fi, mobile data connection or any type of centralized data connection or proxy (e.g. mobile phone connectivity). Further, in an embodiment, the device may be configured for communicating and sharing content, or state over a communication network including internet, Wi-Fi, mobile data connection or any type of centralized data connection or proxy (e.g. mobile phone connectivity). Further, a user may tap the device to a second device or object to reveal digital content associated with the device, or to share the digital content with the second device or object. For instance, the user may tap the device to the second device, or object, or one or more devices and objects in different combinations to share the digital content. As part of the system, one or more unconnected devices, such as wearable wristbands may be obtained (such as purchased) with pre-loaded content to be 'revealed' in various ways. For instance, a wearable wristband 1102, as shown in FIG. 11 may comprise 6 characters that may be unknown at a time of purchase. Further, once the wearable wristband 1102 is turned on, one or more characters may be revealed, or may be revealed upon interaction, such as a tap with one or more devices, such as a smartphone 1104, or objects, such as the second wristband 1106. Further, in an embodiment, the wearable wristband 1102 may comprise a Collect-i-dek digital album. Further, firmware of the device (such as the wearable wristband 1102), may read the one or more objects and may be configured to react an object ID corresponding to the one or more objects. Further, the device may process a proprietary data payload of the one or more objects. For example, the firmware may be configured for loading and displaying content within the one or more objects. Further, the firmware may identify an id as a device and may be configured to automatically trigger application features and allow content sharing. Further, the system may facilitate unique digital reveals and surprises on unconnected devices and through peer-to-peer interaction. For example, a birthday party pack of 15 bands may include 15 unique reveals without parental Wi-Fi/internet set-up, immediate reveal of characters by simply tapping if needed, and no physical product to carry around, avoid losing afterward or physical product that eventually become a waste to landfill problem.

Further, according to some embodiments, a system to facilitate parameter-driven or event-driven configuration for digital reveals is disclosed. Further, the system may facilitate revealing of characters or other digital content with a device based upon parameter-based or event-based configurations.

For example, if a device comprises 6, pre-loaded characters, one or more may be revealed immediately upon turning on the device. Further, one or more characters may be revealed based on other on-interactive parameters, such as one character reveal each day. Further, one or more characters may be revealed based one or more parameters, such as on sensing that the user may have walked 10,000 steps in a day, or may have tapped 2 other devices or objects.

In an embodiment, the user may purchase a Collectif-i band that may comprise 6 digital characters of which 5 may be revealed once-a-day. The sixth character may be revealed if the user purchases a Collect-i-dek digital album that the user may need to tap. Further, the system may facilitate collectible, and tradeable digital reveals as part of an initial purchase. Further, unboxing and reveals may be based on interacting with other unconnected devices in a true peer-to-peer fashion. Further, the system may facilitate rich (robust) unboxing and reveal/surprise experiences and rewards that may go beyond one-time, physical unboxing and may not be socially-isolated, and may be interactive.

Further, according to some embodiments, a proximity based system with tap-managed content and collectible sharing 20 notifications is disclosed.

Further, a method for sharing and finding collectibles with a tap and proximal awareness—without a primary need to navigate a mobile phone application/website nor have a connected device (e.g. unconnected device) is disclosed.

A firmware may allow one or more users to "tap" NFC-embedded objects or devices to share or trade collectible characters and digital content with others. Two device owners may share content by simply tapping devices and the content may be shared or traded. If the device is a digital album (determined based on the firmware interaction and device id) the content may be stored or retrieved. In an embodiment, the objects may include wristbands that may be tapped in a peer-to-peer context to share content, such as one or more characters.

In an embodiment, the shared content may comprise an associated 'half-life' after which the content may start to disappear. Further, the system may allow collectibles to be shared on a permanent or non-permanent basis. Further, traded characters/content may be permanent and may be fully instantiated within the system. A shared character may allow a user to experience the characters or content on a 'trial' (aka temporary) basis and perhaps with certain configured limitations. For example, a shared character may be fully experienced as part of a collection but that character may have a 1-week life during which the character may slowly begin to fade until deletion or inactivation, leading to visibility as a non-functioning silhouette. However, a shared character's configuration may allow the character to "live" indefinitely if the user has a Collect-i-Dek digital album or if there are other parameters in place to which the character may be tapped or saved permanently. Further, an inactive shared character may be revived as either a shared character (thus restarting the 1 week/configurated half-life) or a permanent character if the character is revived via a tapping with a revival character/function (such as corresponding to a band or other purchased item). Further, any accessories and stats that the shared character may have amassed in "Shared" state may be retained or revived.

Further, the system may a user to be notified on a device, if there are one or more users within a predefined proximity of who may possess a character, accessory, or other items that the user may desire. Further, the user may touch or utilize a gesture controlled activation related to the notification to begin a near-proximity introduction to the one or more users and an interaction may lead to a simple share or trade. Further, the user may create a list of specific characters or content or hashtags that the user may desire. Further, a device of the user may broadcast the list to one or more devices in proximity which may respond with any content that the user may require. Further, in an embodiment, the device may generate an alert of content that the user may not have. For example, one or more devices may broadcast to the device any extra characters and shareable content that may be available. Accordingly, the user may not need to specify long lists of uncollected characters in order to received notifications.

Further, a notification may include a display visual notification (lighted border flash) as well as a momentary small message or image subset of detected characters. For example, a notification may describe top 3 characters that one or more users near the user may possess.

Further, a notification may describe that one or more devices may include one or more characters that may complete a collection of the user. The user may touch the notification which displays a visual pattern or description allowing for the user to communicate with the one or more devices.

Further, the system may combine elements of unboxing mystery digital content on unconnected devices, and may add elements like digital collecting, sharing, and trading.

Further, the system may allow digital reveals and surprises on unconnected devices and through peer-to-peer interaction Further, the system may allow characters and content to be revealed and transferred to a device from one or more devices or unpowered NFC tags.

Further, in some embodiments, a Domain Specific Language (DSL) for tap-managed content is disclosed. The system may provide a proprietary Domain Specific Language (DSL) for content encoding, compression, description, and data/interaction management which that also serves as a bridge that may transcend historically separated technology systems such as like iOS® and Android®, and various proprietary devices. A wristband may be tapped to transfer characters or content from other bands, iWatches® to Android® smartphones, iPhones®, tablets, and so on through a tap.

The system may consist of firmware that may be embedded within devices and software/Software SDK within mobile applications that may leverage NFC and Bluetooth as a data connection transport to communicate and interpret a common DSL. The system may also provide for modifying the DSL payload as a mechanism to manage tap interactions. For example, increasing a Tap counter that can then may be interpreted by subsequently tapped devices to determine if a character or content may be shared or traded any further.

The DSL may provide a ParticleType and DSLType designator which may allow for an ability to search within content of a character for abilities and actions to provide for stateless and distributed interaction and content as part of a social blockchain interaction. For example, a virtual room may be created and shared with one or more users, and capabilities and actions of the virtual room may be defined.

Figure 12:
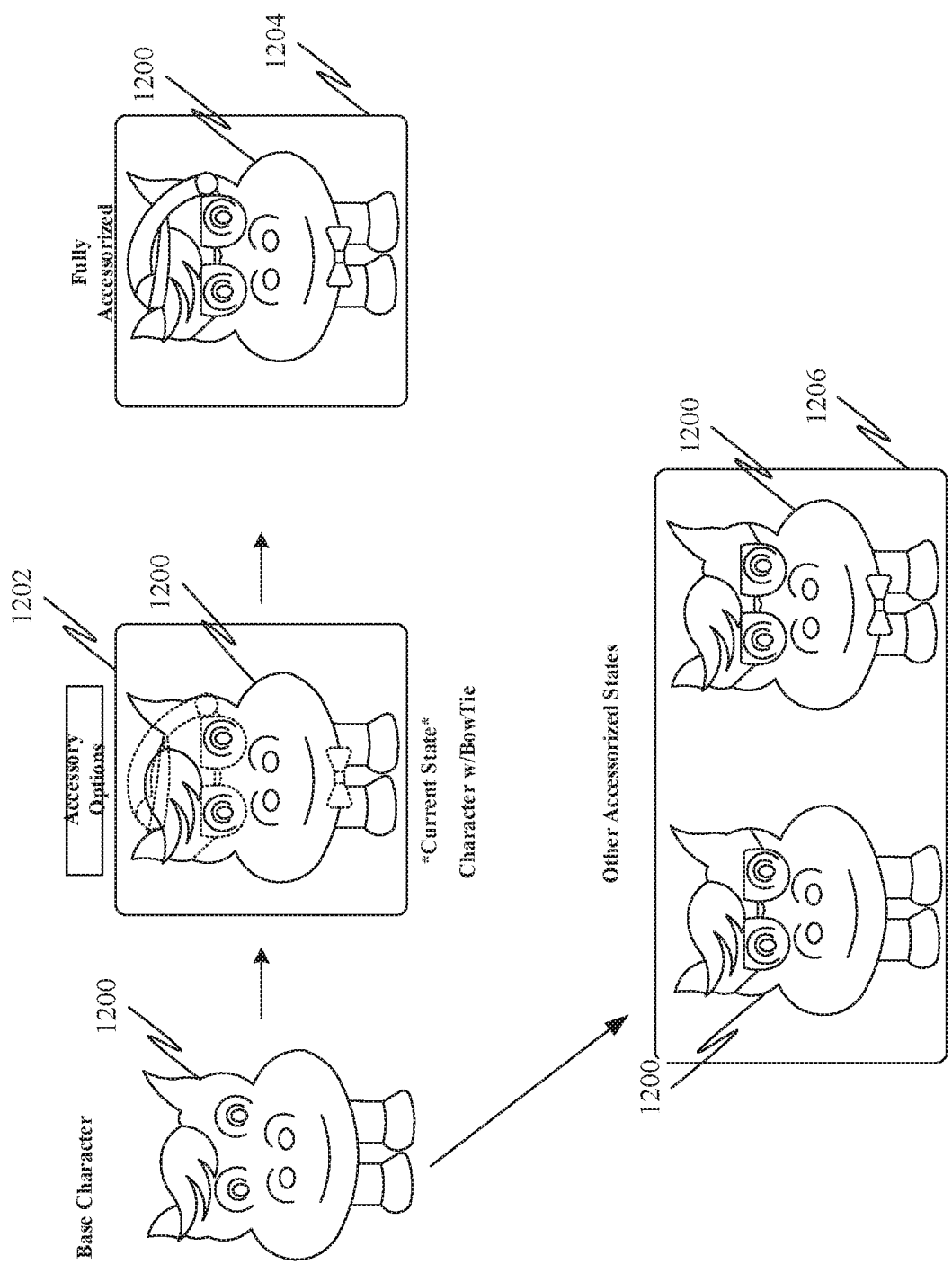
FIG. 12 is a representation of a character with a plurality of potential accessories, in accordance with some embodiments.

FIG. 12 is a representation of a character 1200 with a plurality of potential accessories, in accordance with some embodiments. 1202 is a view of the character 1200 with potential uncollected accessory options. Further, 1204 is a view of the character 1200 with a plurality of potential accessories collected by the character 1200. Further, 1206 is a view of the character 1200 with one or more potential accessory options that may be collected by the character 1200.

Further, the system may comprise a simple, hands-free mechanism to exchange content/characters across one or more devices within an application context. The content may be immediately reflected within an application experience that may fulfill an objective of a user (i.e. see character displayed within a collection), and may not require an established data network, hands-on data transfer set-up, manipulation, or post-transfer manipulation.

Further, in accordance with some embodiments, a digital content storage, and customization system, including digital albums is disclosed.

The system may allow for a user device, such as a smartphone, or a tablet to store and manage digital collections. Wearable devices may be limited in storage. The digital album may allow a user to simply tap a device to the user device, such as a tablet to store content to create room to receive additional characters or content without having to lose existing content and characters. The digital album may hold a plurality of characters and content compared. Further, a larger display device of a tablet or smartphone may allow for sharing of broader statistics and content information and may display an entire portfolio of Characters, along with a progress towards completing a collection.

Additionally, the digital album may allow the user to select one or more characters to be sent to a device with a tap allowing for very simple wearable device customization. For example, the user may feel like showing a rare set of 15 characters or related fashionable content as opposed to a theme of character. Further, the digital album may also allow to the play pattern of keeping shared characters that would otherwise, based on their configuration, disappear after a period of time.

In an embodiment, a user may purchase a Digital Album (i.e. Collectif-i-dek) to which the user may periodically a device to store Characters and view overall collection and collectible progress. The User may select themes of characters/content from the digital album that the user may wish to display on the device through customized playlists.

According to some embodiments, a method and system for creating ad-hoc shared virtual experiences is disclosed. Further, the system may comprise a hands-free mechanism for forming and participating in peer-to-peer, mesh digital experiences.

Further, the system may provide a simple and secure way for multiple users to enter virtual rooms or shared experiences using one or more devices without the need for an internet or Wi-Fi network connection.

Further, according to some embodiments, a system for hands-free initiation of shared group digital experiences is disclosed.

Further, the system may include devices with NFC and Bluetooth Low Energy and/or Bluetooth Mesh capability. Further, the system may include utilizing NFC communications to establish a private secure Bluetooth network as well as application-level group initialization (i.e., initial authentication/authorization of the device, protocol for determining the master device for a virtual group experience, etc.). After the Bluetooth network may be initialized, group firmware/software communications may occur over the Bluetooth network.

First, a first user may put a first device into a master "Friend" mode where the first device may be the designator and arbitrator of shared assets—for example, the type of virtual room within one or more characters representing other users may appear. In an embodiment, the first user may not put the first device into master "Friend" mode. Further, firmware may establish a master arbitrator amongst the first user and a second user to tap and initialize the group. Firmware on the first device and a second device may exchange key and information regarding initializing a Bluetooth network. An initialization vector may be exchanged for provisioning a secure Bluetooth mesh or BLE connection as well as determining which device may be the master arbitrator at a firmware application level. At a firmware application level, each device that joins the group may be also be provided a group state, including and not limited to virtual room assets and virtual room state (e.g., the characters populating the room and their state). Each device that joins the group may see a 'live' view of the room and each group members character within it. Further, a count-down timer may on each device showing a time remaining for any additional user to join the group. Any group devices may 'Tap' a non-group device the device to receive the initialization vector and join the group. Every time a non-group band may join the group, the countdown timer may reset to restart the counter sequence, at which time the timer may be reset through a mesh broadcast on all devices, or the timer may continue uninterrupted. Once the timer expires no additional device may join the group. Further, the group master may be virtually changed by taping another device of the group, at which point the tapped device may be updated as the master, keep group state, and the change broadcast to the group.

Further, a group initiation could also be started by tapping an NFC Tag especially encoded with parameters for a network like a network group address and a well-known address for a storing group state (i.e. master device, etc.). Further, the group may be disbanded once the master device exits from the group.

Further, a group initiation could also be started by tapping an NFC Tag especially encoded with parameters for a network like network group address and a well-known address for a storing group state (i.e. master device, etc.) whereby one or more devices may, upon tapping the NFC Tag, the one or more devices may see a live view of a different virtual room.

Figure 13:
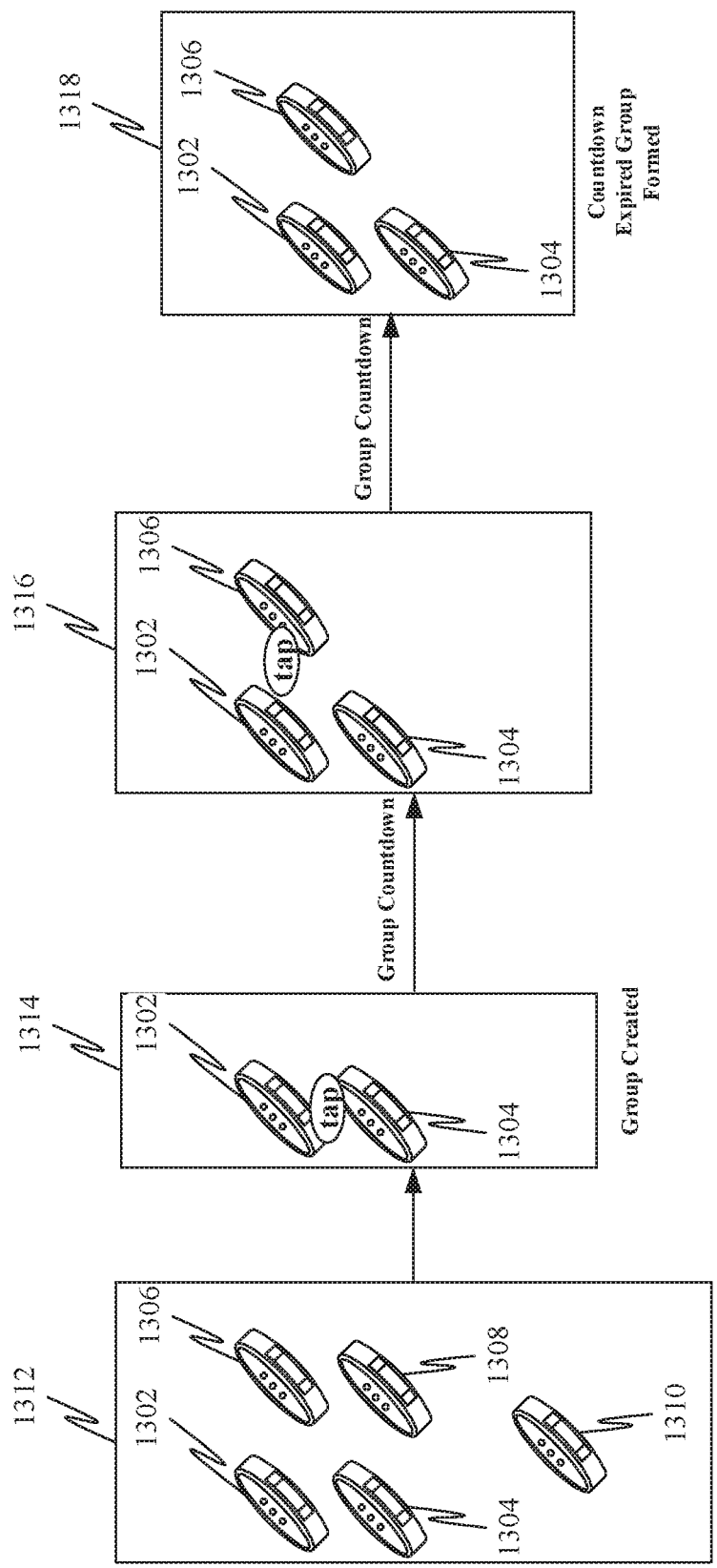
FIG. 13 is a representation of creation of a group, in accordance with some embodiments.

FIG. 13 is a representation of creation of a group, in accordance with some embodiments. At step 1312, five individual users represented by five devices, such as a first device 1302, a second device 1304, a third device 1306, a fourth device 1308, and a fifth device 1310 may be available. Further, at step 1314, the first device 1302 and the second device 1304 may initiate a Group session. Further, at step 1316, the third device 1306 may join the group within a predetermined time, such as a 12 second window. Further, at step 1318, the group may become active after the predetermined time including the first device 1302, the second device 1304, and the third device 1306.

Figure 14:
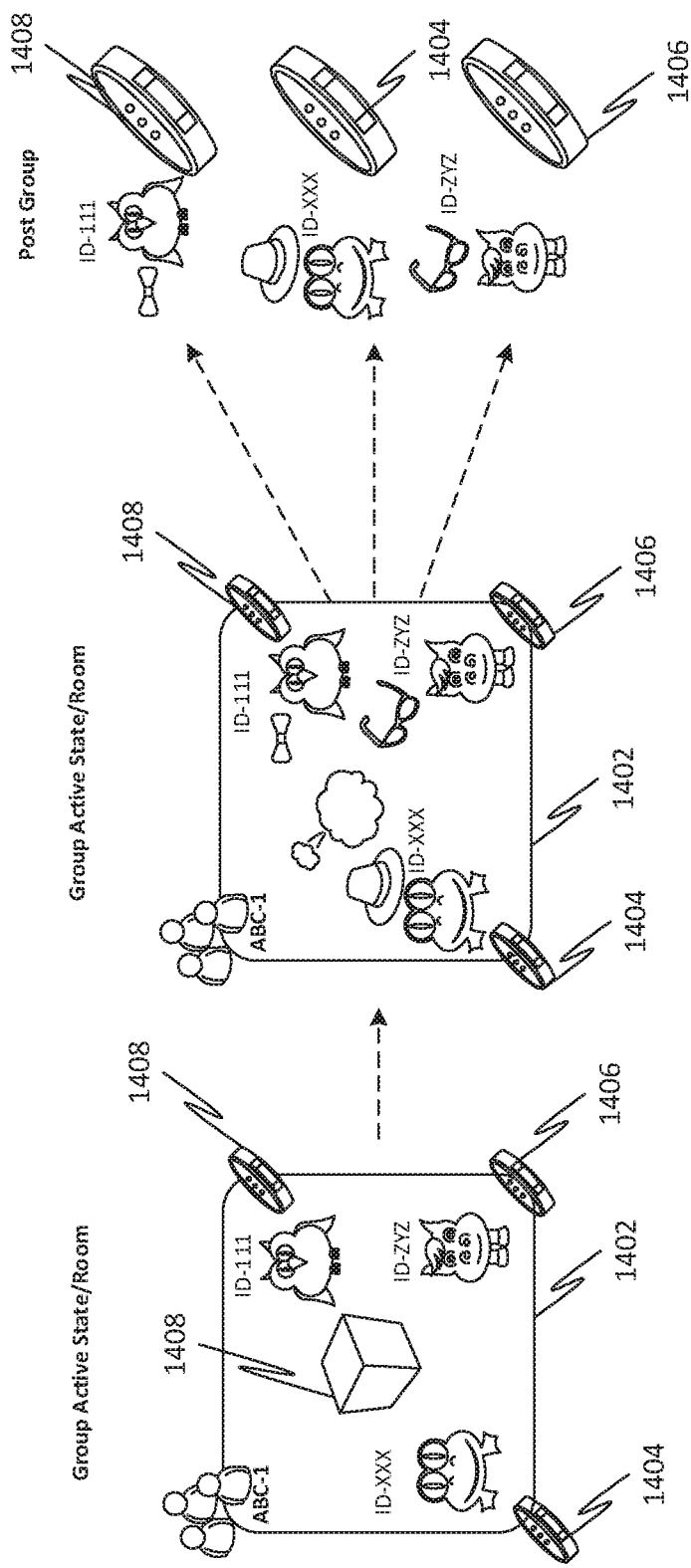
FIG. 14 is a representation of a group experience, in accordance with some embodiments.

According to some embodiments, a system to facilitate participation in and control of shared digital shared experiences, such as via Bluetooth communications—without necessarily using a traditional network/cellular/internet connection or communications is disclosed. Further, as shown in FIG. 14, once a shared experience/group is initiated, a shared virtual room 1402, viewable across all participating devices such as a first device 1404, second device 1406, and a third device 1408, may then start another countdown and/or deliver a mystery box 1410 which may animate and open giving each character within the room a reward, such as an accessory, action, or other digital element. Further, shared group assets, such as the appearing of the mystery box 1410, may be controlled by the master device, such as the first device 1404. Each user in the group may control a character corresponding to the group member within the virtual room. For example, shaking a wearable device, such as the second device 1406 may make a character dance, which may be communicated using a domain specific language (DSL) for controlling and manipulating images and sprites. This DSL may be included in a share state broadcast to group members over the established Bluetooth network. Further, a group member may trigger a wearable device, such as the third device 1408 (such as by pressing a button or executing a gesture) to take a picture (image capture) of the group/virtual room as a keepsake.

Further, group session may either end automatically as determined by the firmware (after rewards are given) or through a trigger by a member of the group as determined by the firmware (such as the master user through a firmware action e.g. a button press, gesture, etc.).

Further, once the session ends, each respective device may provide a 'post-group' view, such as including a character with a new accessory and/or statistics from the group experience, etc.

Further, according to some embodiments, a method and system to provide digital rewards and content in group wearable experiences, without the need for a central authority, nor a needed data connection thereto, to arbitrate the rewards or to maintain persistent state outside of a participating device itself is disclosed. The system and method may provide relevant rewards for each user without the need for a centralized authority or understanding of all potential aspects of group submitted the content. Moreover, the system may allow consideration of elements outside of the specific group experience.

Further, a stateless group experience is facilitated should devices leave a group, and for ensuring an understanding of device state to determine which accessories are valid for each character, such as by considering accessories that the device/character may already possess, etc.

Additionally, since each individual Device calculates outcomes and rewards, the Devices may factor in device elements (i.e., heartbeat, location, etc.) that may be to data-intensive or personal to broadcast.

FIG. 15 is an illustration of the online platform 1500 consistent with various embodiments of the present disclosure. By way of non-limiting example, the online platform 1500 to facilitate proximity based interaction with a short range communication enabled object may be hosted on a centralized server 1502, such as, for example, a cloud computing service. The centralized server 1502 may communicate with other network entities, such as, for example, a mobile device 1504 (such as a smartphone, a laptop, a tablet computer etc.), other electronic devices 1506 (such as desktop computers, server computers etc.), databases 1508, sensors 1510, and a wearable electronic device 1522 over a communication network 1514, such as, but not limited to, the Internet. Further, users of the online platform 1500 may include relevant parties such as, but not limited to, end users, administrators, service providers, service consumers and so on. Accordingly, in some instances, electronic devices operated by the one or more relevant parties may be in communication with the platform.

A user (such as the user 1516), such as the one or more relevant parties, may access online platform 1500 through a web-based software application or browser. The web-based software application may be embodied as, for example, but not be limited to, a website, a web application, a desktop application, and a mobile application compatible with a computing device 1600.

Further, in some embodiments, the online platform 1500 may facilitate proximity based interaction with the short range communication enabled object 108. Further, the portable electronic device 100, and the short range communication enabled object 108 may communicate with the online platform 1500 such as to access the market user interface, to craft, and/or alter the first digital asset and the second digital asset, to store the first digital asset and the second digital asset, and to transmit the first digital asset and the second digital asset. Further, in an embodiment, the online platform 1500 may interface with at least one of the portable electronic device 100, and the short range communication enabled object 108 to back up at least one of the first digital asset and the second digital asset, such as on databases 1508.

Figure 16:
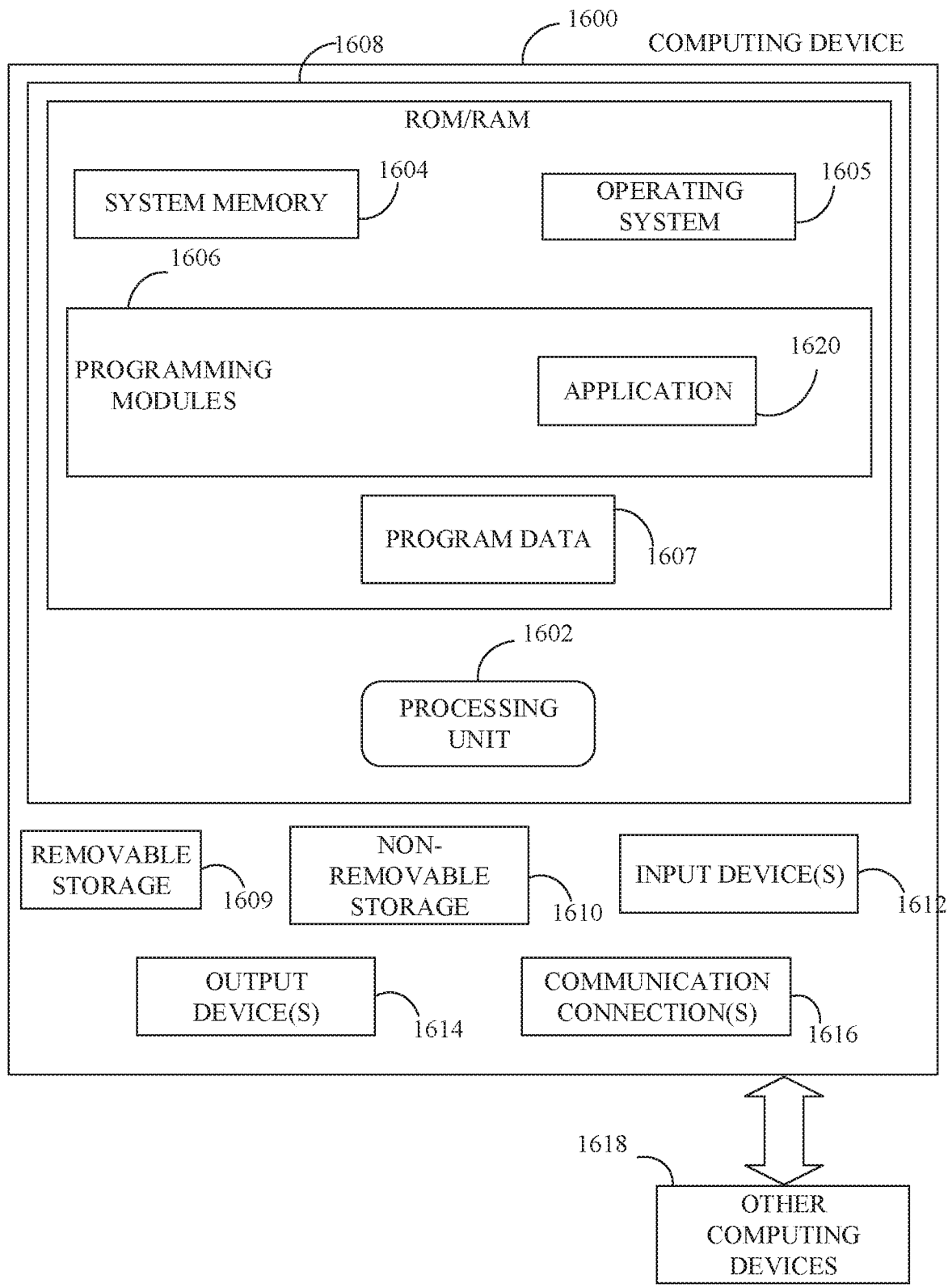
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A portable electronic device for facilitating a proximity based interaction with a short range communication enabled object, the portable electronic device comprising:
   a transceiver configured for transmitting a transmitted short range communication signal and receiving a received short range communication signal, wherein each of the transmitting and receiving is performed wirelessly over a short range communication channel;
   a processor communicatively coupled to the transceiver, wherein the processor is configured for:
      detecting a proximity based event based on receiving the received short range communication signal from the short range communication enabled object, wherein the short range communication object is configured for:
         storing a second digital asset and a second object identifier associated with the second digital asset; and
         transmitting, wirelessly over the short range communication channel, each of the second digital asset and the second object identifier;
      analyzing the received short range communication signal based on the detecting of the proximity based event;
      determining a second object identifier associated with the short range communication enabled object based on the analyzing; and
      performing a predetermined action based on the second object identifier; and
   a memory device communicatively coupled to the processor, wherein the memory device is configured for storing a first digital asset and a first object identifier associated with the first digital asset, wherein each of the first digital asset, and the second digital asset comprises at least one of a static pattern, a moving pattern, and a pattern comprising one or more effects, wherein the transceiver is configured to transmit the first digital asset to a user device, wherein the user device is configured to modify the first digital asset, wherein the user device is configured to transmit a modified first digital asset to the portable electronic device, wherein the first presentation device of the portable electronic device is configured to present the modified first digital asset.

2. The portable electronic device claim 1, wherein the portable electronic device comprises a first presentation device configured to present the first digital asset, wherein the short range communication enabled object comprises a second presentation device configured to present the second digital asset, wherein the short range communication enabled object is configured to transmit the second digital asset to the user device, wherein the user device is configured to modify the second digital asset, wherein the user device is configured to transmit a modified second digital asset to the short range communication enabled object, wherein the second presentation device of the short range communication enabled object is configured to present the modified second digital asset.

3. The portable electronic device of claim 2, wherein the processor is configured for detecting a post-tap gesture from the portable electronic device, wherein the predetermined action is accepted based on the detecting of the post-tap gesture.

4. The portable electronic device of claim 1, wherein the processor is configured for detecting a pre-tap gesture from the portable electronic device, wherein an interaction-mode is enabled in the portable electronic device based on the detecting of the pre-tap gesture.

5. The portable electronic device of claim 1, wherein the processor is further configured for creating a combined digital asset based on the first digital asset, and the second digital asset, wherein the creating of the combined digital asset is based on the proximity based event.

6. A portable electronic device for facilitating a proximity based interaction with a short range communication enabled object, the portable electronic device comprising:
   a transceiver configured for:
      transmitting a transmitted short range communication signal, wherein the is performed wirelessly over a short range communication channel;
      receiving a received short range communication signal, wherein the receiving is performed wirelessly over the short range communication channel; and
      receiving a second digital asset and a second object identifier associated with the second digital asset from the short range communication enabled object;
   a processor communicatively coupled to the transceiver, wherein the processor is configured for:
      detecting a proximity based event based on receiving the received short range communication signal from the short range communication enabled object, wherein the short range communication enabled object is configured for:
         storing a second digital asset and a second object identifier associated with the second digital asset; and
         transmitting, wirelessly over the short range communication channel, each of the second digital asset and the second object identifier;
      creating a combined digital asset based on a first digital asset, and the second digital asset, wherein the creating of the combined digital asset is based on the proximity based event; and a memory device communicatively coupled to the processor, wherein the memory device is configured for storing the first digital asset, the combined digital asset, and a first object identifier associated with the first digital asset.

7. The portable electronic device of claim 6 comprising a wearable electronic device.

8. The portable electronic device of claim 6, wherein the short range communication enabled object comprises at least one of a short range communication enabled trading object, a short range communication enabled poster, an NCF enabled product, an NFC enabled figurine, and a short range communication enabled product packaging.

9. The portable electronic device of claim 6, wherein each of the first digital asset, and the second digital asset comprises at least one of a static pattern, a colored pattern, a moving pattern, and a pattern comprising one or more effects.

10. A portable electronic device for facilitating a proximity based interaction with a short range communication enabled object, the portable electronic device comprising:
   a transceiver configured for transmitting a transmitted short range communication signal and receiving a received short range communication signal, wherein each of the transmitting and the receiving is performed wirelessly over a short range communication channel;
   at least one sensor device configured to generate at least one of a first sensor data, and a second sensor data;
   a processor communicatively coupled to each of the transceiver, and the at least one sensor device, wherein the processor is configured for:
      detecting a sensor based on the first sensor data received from the at least one sensor device;
      entering the first portable electronic device in an interaction mode based on the detecting of the pre-tap gesture;
      detecting a proximity based event based on receiving the received short range communication signal from the short range communication enabled object, wherein the short range communication enabled object is configured for:
         storing a second digital asset and a second object identifier associated with the second digital asset; and
         transmitting, wirelessly over the short range communication channel, each of the second digital asset and the second object identifier;
      performing a predetermined action based on the detecting of the proximity based event;
      detecting a post-tap gesture based on the second sensor data; and
      performing one of an acceptance and a rejection of the predetermined action based on the determining; and
   a memory device communicatively coupled to the processor, wherein the memory device is configured for storing a first digital asset, a first object identifier associated with the first digital asset.

11. The portable electronic device of claim 10, wherein the predetermined action comprises receiving the second digital asset, wherein the memory device is configured for storing the second digital asset based on the detecting of the post tap gesture.

12. The portable electronic device of claim 10, wherein the predetermined action comprises transmitting the first digital asset to the short range communication enabled object based on the detecting.

* * * * *